(12) United States Patent
Barksby et al.

(10) Patent No.: US 11,021,567 B2
(45) Date of Patent: *Jun. 1, 2021

(54) POLYOLS FOR IMPROVED VISCOELASTIC FOAMS WITH REDUCED TEMPERATURE SENSITIVITY

(71) Applicant: Covestro LLC, Pittsburgh, PA (US)

(72) Inventors: Nigel Barksby, Moon Township, PA (US); Brian L. Neal, Pittsburgh, PA (US); Susan B. McVey, Houston, PA (US); John E. Hayes, Gibsonia, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,165

(22) Filed: Mar. 12, 2018

(65) Prior Publication Data

US 2018/0265624 A1  Sep. 20, 2018

Related U.S. Application Data

(60) Provisional application No. 62/471,423, filed on Mar. 15, 2017.

(51) Int. Cl.

| | |
|---|---|
| *C08G 18/16* | (2006.01) |
| *C08G 18/18* | (2006.01) |
| *C08G 18/20* | (2006.01) |
| *C08G 18/24* | (2006.01) |
| *C08G 18/28* | (2006.01) |
| *C08G 18/40* | (2006.01) |
| *C08G 18/48* | (2006.01) |
| *C08G 18/63* | (2006.01) |
| *C08G 18/66* | (2006.01) |
| *C08G 18/76* | (2006.01) |
| *C08J 9/12* | (2006.01) |
| *C08J 9/14* | (2006.01) |

(52) U.S. Cl.
CPC ....... *C08G 18/7621* (2013.01); *C08G 18/165* (2013.01); *C08G 18/1808* (2013.01); *C08G 18/1825* (2013.01); *C08G 18/1833* (2013.01); *C08G 18/2081* (2013.01); *C08G 18/244* (2013.01); *C08G 18/283* (2013.01); *C08G 18/4072* (2013.01); *C08G 18/4804* (2013.01); *C08G 18/485* (2013.01); *C08G 18/4812* (2013.01); *C08G 18/4833* (2013.01); *C08G 18/4837* (2013.01); *C08G 18/4866* (2013.01); *C08G 18/632* (2013.01); *C08G 18/637* (2013.01); *C08G 18/667* (2013.01); *C08J 9/125* (2013.01); *C08J 9/145* (2013.01); *C08G 2110/005* (2021.01); *C08G 2110/0008* (2021.01); *C08G 2110/0058* (2021.01); *C08G 2110/0083* (2021.01); *C08G 2280/00* (2013.01); *C08G 2350/00* (2013.01); *C08J 2201/022* (2013.01); *C08J 2203/10* (2013.01); *C08J 2203/142* (2013.01); *C08J 2205/06* (2013.01); *C08J 2205/08* (2013.01); *C08J 2375/08* (2013.01)

(58) Field of Classification Search
CPC .............. C08G 18/283; C08G 18/4072; C08G 18/4804; C08G 18/4812; C08G 18/4833; C08G 18/4837; C08G 18/485; C08G 2280/00

See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,404,109 A | 10/1968 | Milgrom |
| 3,405,077 A | 10/1968 | Pastor et al. |
| 3,427,334 A | 2/1969 | Belner |
| 3,433,752 A | 3/1969 | Zagoren et al. |
| 3,454,504 A | 7/1969 | Murai et al. |
| 3,523,093 A | 8/1970 | Stamberger |
| 3,538,043 A | 11/1970 | Herold |
| 3,652,639 A | 3/1972 | Pizzini et al. |
| 3,823,201 A | 7/1974 | Pizzini et al. |
| 3,875,086 A | 4/1975 | Ramey et al. |
| 3,900,518 A | 8/1975 | Milgrom |
| RE28,715 E | 2/1976 | Stamberger |
| 3,941,849 A | 3/1976 | Herold |
| RE29,118 E | 1/1977 | Stamberger |
| 4,089,835 A | 5/1978 | König et al. |
| 4,104,236 A | 8/1978 | Simroth |
| 4,111,865 A | 9/1978 | Seefried, Jr. et al. |
| 4,119,586 A | 10/1978 | Shah |
| 4,125,505 A | 11/1978 | Critchtield et al. |
| 4,148,840 A | 4/1979 | Shah |

(Continued)

FOREIGN PATENT DOCUMENTS

JP      2000290344 A    10/2000

OTHER PUBLICATIONS

Jones, R.E. and Fesman, G., Journal of Cellular Plastics, Air Flow Measurement and Its Relations to Cell Structure, Physical Properties, and Processibility for Flexible Urethane Foam, Jan. 1965, vol. No. 1, pp. 200-216.

*Primary Examiner* — Melissa A Rioja

(74) *Attorney, Agent, or Firm* — N. Denise Brown

(57) ABSTRACT

This invention relates to a process for preparing viscoelastic polyurethane foam in which the isocyanate-reactive component comprises a specific polyol blend, and to viscoelastic polyurethane foam wherein the isocyanate-reactive comprises the specific polyol blend. The polyol blend may be an in situ formed polyol blend.

21 Claims, 2 Drawing Sheets

(56) References Cited

U.S. PATENT DOCUMENTS

| | | |
|---|---|---|
| 4,172,825 A | 10/1979 | Shook et al. |
| 4,209,593 A | 6/1980 | Khanna |
| 4,260,530 A | 4/1981 | Reischl et al. |
| 4,324,715 A | 4/1982 | Emerick |
| 4,374,209 A | 2/1983 | Rowlands |
| 4,438,001 A | 3/1984 | Suzuki et al. |
| 4,472,560 A | 9/1984 | Kuyper et al. |
| 4,477,589 A | 10/1984 | van der Hulst et al. |
| 4,524,157 A | 6/1985 | Stamberger |
| 4,656,196 A | 4/1987 | Kelly et al. |
| 4,670,477 A | 6/1987 | Kelly et al. |
| 4,690,956 A | 9/1987 | Ramlow et al. |
| 4,826,887 A | 5/1989 | Kuyper et al. |
| 4,826,952 A | 5/1989 | Kuyper et al. |
| 4,826,953 A | 5/1989 | Kuyper et al. |
| 4,950,694 A | 8/1990 | Hager |
| 4,950,695 A | 8/1990 | Stone |
| 4,950,965 A | 8/1990 | Kenny et al. |
| 4,981,880 A | 1/1991 | Lehmann et al. |
| 5,011,908 A | 4/1991 | Hager |
| 5,114,619 A | 5/1992 | Heuvelsland |
| 5,145,883 A | 9/1992 | Saito et al. |
| 5,158,922 A | 10/1992 | Hinney et al. |
| 5,292,778 A | 3/1994 | Van Veen et al. |
| 5,321,077 A | 6/1994 | Hayes et al. |
| 5,324,774 A | 6/1994 | Nishikawa et al. |
| 5,358,984 A | 10/1994 | Hayes et al. |
| 5,364,906 A | 11/1994 | Critchfield et al. |
| 5,453,469 A | 9/1995 | Yezrielev et al. |
| 5,470,813 A | 11/1995 | Le-Khac |
| 5,482,908 A | 1/1996 | Le-Khac |
| 5,488,085 A | 1/1996 | Hayes et al. |
| 5,496,894 A | 3/1996 | Critchfield et al. |
| 5,539,011 A | 7/1996 | Hilker et al. |
| 5,554,662 A | 9/1996 | Sanders et al. |
| 5,594,066 A | 1/1997 | Heinemann et al. |
| 5,631,319 A | 5/1997 | Reese et al. |
| 5,670,601 A | 9/1997 | Allen et al. |
| 5,689,012 A | 11/1997 | Pazos et al. |
| 5,777,177 A | 7/1998 | Pazos |
| 5,814,699 A | 9/1998 | Kratz et al. |
| 5,824,712 A | 10/1998 | Willkomm et al. |
| 5,916,994 A | 6/1999 | Izukawa et al. |
| 5,919,988 A | 7/1999 | Pazos et al. |
| 5,990,185 A | 11/1999 | Fogg |
| 5,995,534 A | 11/1999 | Fullerton et al. |
| 6,034,145 A | 3/2000 | Cornet et al. |
| 6,034,197 A | 3/2000 | Mahon et al. |
| 6,063,309 A | 5/2000 | Hager et al. |
| 6,066,683 A | 5/2000 | Beisner et al. |
| 6,117,937 A | 9/2000 | Matsumoto et al. |
| 6,136,879 A | 10/2000 | Nishida et al. |
| 6,218,444 B1 | 4/2001 | Hager et al. |
| 6,391,820 B1 | 5/2002 | Ooms et al. |
| 6,391,933 B1 | 5/2002 | Mattesky |
| 6,391,935 B1 | 5/2002 | Hager et al. |
| 6,455,603 B1 | 9/2002 | Fogg |
| 6,472,447 B1 | 10/2002 | Lorenz et al. |
| 6,491,846 B1 | 12/2002 | Reese, II et al. |
| 6,521,674 B1 | 2/2003 | Haley et al. |
| 6,624,209 B2 | 9/2003 | Kawamoto et al. |
| 6,638,986 B2 | 10/2003 | Falke et al. |
| 6,713,599 B1 | 3/2004 | Hinz et al. |
| 6,756,414 B2 | 6/2004 | Kawamoto et al. |
| 6,762,214 B1 | 7/2004 | Tracy et al. |
| 6,821,308 B2 | 11/2004 | Combs et al. |
| 6,838,516 B2 | 1/2005 | Dai et al. |
| 7,051,389 B2 | 5/2006 | Wassilefsky |
| 7,078,443 B2 | 7/2006 | Milliren |
| 7,179,882 B2 | 2/2007 | Adkins et al. |
| 7,415,742 B2 | 8/2008 | Wassilefsky |
| 7,469,437 B2 | 12/2008 | Mikkelsen et al. |
| 7,530,127 B2 | 5/2009 | Leifermann et al. |
| 7,735,169 B2 | 6/2010 | Wassilefsky |
| 7,754,809 B2 | 7/2010 | Stollmaier et al. |
| 7,759,423 B2 | 7/2010 | Chauk |
| 7,968,754 B2 | 6/2011 | Ostrowski et al. |
| 7,977,501 B2 | 7/2011 | Haider et al. |
| 8,134,022 B2 | 3/2012 | Haider et al. |
| 8,242,184 B2 | 8/2012 | Sasaki et al. |
| 8,268,906 B2 | 9/2012 | Sasaki et al. |
| 8,318,823 B2 | 11/2012 | Triouleyre et al. |
| 8,324,419 B2 | 12/2012 | Mijolovic et al. |
| 8,418,297 B2 | 4/2013 | Mikkelsen et al. |
| 8,487,015 B2 | 7/2013 | Sasaki et al. |
| 8,541,479 B2 | 9/2013 | Sasaki et al. |
| 8,656,537 B2 | 2/2014 | Leifermann et al. |
| 8,946,466 B2 | 2/2015 | Gürtler et al. |
| 8,975,306 B2 | 3/2015 | Milliren |
| 8,975,335 B2 | 3/2015 | Hager et al. |
| 9,029,432 B2 | 5/2015 | Aou et al. |
| 9,133,298 B2 | 9/2015 | Hager et al. |
| 9,249,259 B2 | 2/2016 | Müller et al. |
| 9,255,174 B2 | 2/2016 | Aou et al. |
| 9,266,996 B2 | 2/2016 | Obi et al. |
| 9,376,526 B2 | 6/2016 | Hager et al. |
| 9,593,199 B2 | 3/2017 | Wamprecht et al. |
| 2004/0019160 A1 | 1/2004 | Dai et al. |
| 2007/0299153 A1 | 12/2007 | Hager et al. |
| 2008/0139685 A1 | 6/2008 | Reese et al. |
| 2009/0062416 A1 | 3/2009 | Sasaki et al. |
| 2009/0215918 A1 | 8/2009 | Sasaki et al. |
| 2010/0168262 A1 | 7/2010 | Sasaki et al. |
| 2012/0202908 A1 | 8/2012 | Sasaki et al. |
| 2013/0035413 A1 | 2/2013 | Obi et al. |
| 2013/0289150 A1 | 10/2013 | Hager et al. |
| 2015/0077640 A1 | 3/2015 | Kanda |
| 2015/0284500 A1* | 10/2015 | Zhao .................. C08G 18/4883 521/117 |
| 2016/0340464 A1 | 11/2016 | McVey et al. |

* cited by examiner

POLYOLS FOR IMPROVED VISCOELASTIC FOAMS WITH REDUCED TEMPERATURE SENSITIVITY

CROSS REFERENCE TO RELATED APPLICATION(S)

This application claims the benefit of U.S. Provisional Application Ser. No. 62/471,423, filed Mar. 15, 2017, which is hereby incorporated in its entirety by reference.

FIELD

The invention relates to novel viscoelastic polyurethane foams and to a process for preparing these viscoelastic polyurethane foams. The resultant foams have a ratio of the storage modulus at 15° C. to the storage modulus at 30° C. of less than or equal to 5 to about 1 (or less than or equal to 4 to about 1), and a $T_g$ of less than 20° C. as measured by tan delta.

BACKGROUND

The popularity of viscoelastic polyurethane foam, also referred to as memory foam or low resilience foam, has significantly increased in recent years as pillows, toppers or layers in mattresses and bed in a box foams. It is also used in other home and office furnishings. This increased use has created a demand for higher quality viscoelastic foams with high air flow and improved physical properties such as reduced compression set and better tear strength. A common consumer complaint is mattresses changing hardness or firmness during the night and/or as a function of room temperatures. The hardness or firmness of viscoelastic foams is often temperature related. While a person is sleeping on a foam mattress or sitting on a foam cushion, the foam heats up due to thermal transfer from the body toward the foam which can result in a large change in the hardness or firmness of the foam. So while a person might be initially laying or sitting on top of the foam, after a period of time they will be laying or submerged in the foam causing discomfort. Likewise, foams that are temperature sensitive can feel uncomfortably hard on a cold night or too soft on a warm night. An object of the present invention is to solve the temperature sensitivity issue of foams while still maintaining high air flow, low compression set, and good tear strength.

SUMMARY

The novel viscoelastic polyurethane foams comprise the reaction product of:
(1) toluene diisocyanate,
with
(2) an isocyanate-reactive component comprising:
   (a) from 20 to 100% by weight, based on 100% by weight of components (2)(a) and (2)(b), of a polyol blend having a hydroxyl number of from about 56 to less than 120, an average functionality of greater than about 2, and which comprises:
     (i) one or more monofunctional polyethers having a hydroxyl number of less than or equal to 56, and containing less than or equal to 20% by weight of copolymerized oxyethylene, based on the total weight of monofunctional polyether (a)(i),
     (ii) one or more polyether polyols having a hydroxyl number of from 47 to 300, a nominal functionality of 2, and containing from about 5 to about 45% by weight of copolymerized oxyethylene, based on the total weight of polyether polyol (a)(ii), and
     (iii) one or more polyether polyols having a hydroxyl number of about 47 to about 300, a nominal functionality of greater than 2 to about 8, and containing from about 5 to about 45% by weight of copolymerized oxyethylene, based on the total weight of polyether polyol (a)(iii);
   wherein (a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% by weight of the balance comprises component (iii);
and
   (b) up to 80% by weight, based on 100% by weight of components (2)(a) and (2)(b), of one or more polyether polyols having an average functionality of 2 to 8, a hydroxyl number of 20 to 300 and comprising at least 50% by weight of copolymerized oxyethylene, based on the total weight of the polyether polyol (2)(b);
in the presence of:
(3) one or more blowing agents;
(4) one or more catalysts;
and
(5) one or more surfactants;
wherein the quantity, OH number and functionality of components (2)(a)(i), (2)(a)(ii) and (2)(a)(iii) are selected such that the resultant viscoelastic foam has a ratio of the storage modulus at 15° C. to the storage modulus at 30° C. of less than or equal to 5 to about 1 (or less than or equal to 4 to about 1), and a $T_g$ of less than 20° C. as measured by tan delta, over a density of from about 1.0113/ft³ to about 6.0113/ft³ at an NCO Index of greater than 95 to about 110, with the proviso that when the NCO Index is greater than or equal to about 105, the isocyanate-reactive component (2) comprises at least about 3% by weight (or at least about 5% by weight) of (2)(b), based on 100% by weight of component (2).

The process of preparing the viscoelastic polyurethane foams comprises reacting:
(1) toluene diisocyanate,
with
(2) an isocyanate-reactive component comprising:
   (a) from 20 to 100% by weight, based on 100% by weight of components (2)(a) and (2)(b), of a polyol blend having a hydroxyl number of from about 56 to less than 120, an average functionality of greater than about 2, and which comprises:
     (i) one or more monofunctional polyethers having a hydroxyl number of less than or equal to 56, and containing less than or equal to 20% by weight of copolymerized oxyethylene, based on the total weight of monofunctional polyether (a)(i),
     (ii) one or more polyether polyols having a hydroxyl number of from 47 to 300, a nominal functionality of 2, and containing from about 5 to about 45% by weight of copolymerized oxyethylene, based on the total weight of polyether polyol (a)(ii), and
     (iii) one or more polyether polyols having a hydroxyl number of about 47 to about 300, a nominal functionality of greater than 2 to about 8, and containing from about 5 to about 45% by weight of copolymerized oxyethylene, based on the total weight of polyether polyol (a)(iii);
wherein (a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% by weight of the balance comprises component (iii);
and, optionally,
(b) up to 80% by weight, based on 100% by weight of components (2)(a) and (2)(b), of one or more polyether polyols having an average functionality of 2 to 8, a hydroxyl number of 20 to 300 and comprising at least 50% by weight of copolymerized oxyethylene, based on the total weight of the polyether polyol (2)(b);
in the presence of:
(3) one or more blowing agents;
(4) one or more catalysts;
and
(5) one or more surfactants;
wherein the quantity, OH number and functionality of components (2)(a)(i), (2)(a)(ii) and (2)(a)(iii) are selected such that the resultant viscoelastic foam has a ratio of the storage modulus at 15° C. to the storage modulus at 30° C. of less than or equal to 5 to about 1 (or less than or equal to 4 to about 1), and a $T_g$ of less than 20° C. as measured by tan delta, over a density of from about 1.0 lb/ft³ to about 6.0 lb/ft³ at an NCO Index of greater than 95 to about 110, with the proviso that when the NCO Index is greater than or equal to about 105, the isocyanate-reactive component (2) comprises at least about 3% by weight (or at least about 5% by weight) of (2)(b), based on 100% by weight of component (2).

In other embodiments, the isocyanate-reactive component for the viscoelastic polyurethane foams and the process of preparing the viscoelastic polyurethane foams may comprise at least one of: (c) one or more polyether polyols, which are different than (a)(ii) and (a)(iii), having an OH number of from about 10 to about 300, an average functionality of from about 2 to about 8, and which contain from 0 to 45% by weight of copolymerized oxyethylene, based on 100% by weight of component (c); and/or (d) one or more filled polyols which are also commonly referred to as polymer polyols.

Another feature of the present invention involves the use of foam processing aids or foam modifiers that enhance processing and help stabilize the foam against cold flow or dishing.

The polyol blends described herein have also been found to enhance processing of the foam and to provide foams with improved resistance to dishing and which exhibit less tendency to cold flow.

In another embodiment, the polyol blend (2)(a) comprises an in-situ formed polyol blend. These in-situ formed polyol blends (a) can be used in the polyurethane foams and/or in the process of preparing the viscoelastic polyurethane foams described herein. The in-situ formed polyol blend (a) is prepared by:
A) introducing into a reaction vessel a mixture comprising:
(1) an initial starter ($S_i$) comprising one or more monofunctional compounds having a hydroxyl number of less than about 56,
and
(2) a DMC (double metal cyanide) catalyst, B) feeding
(1) an epoxide comprising propylene oxide and ethylene oxide in a weight ratio of from 100:0 to 20:80,
into the reaction vessel;
C) allowing the epoxide mixture and the initial starter ($S_i$) to react and continuing to polymerize by feeding the epoxide until the equivalent weight of the monofunctional compound is increased by at least 10% by weight and reaches a value between about 1,500 and about 6,000;
D) continuously adding
(1) one or more low molecular weight starters ($S_c$) having a nominal functionality of greater than 2 to about 6, and an equivalent weight of about 28 to about 400 into the reaction vessel while continuing to feed epoxide;
E) completing addition of the continuous starter ($S_c$);
and
F) allowing the mixture to continue to polymerize in the reaction vessel thereby forming
(a) an in-situ formed polyol blend which has an overall hydroxyl number of from about 56 to less than 120, an average functionality of greater than about 2, and which comprises
(i) one or more monofunctional polyethers having a hydroxyl number of less than or equal to 56, and containing less than or equal to 20% by weight of copolymerized oxyethylene, based on 100% by weight of (a)(i);
(ii) one or more polyether polyols having a hydroxyl number of 47 to 300, a nominal functionality of 2 and containing from about 5 to about 45% by weight of copolymerized oxyethylene, based on the total weight of the polyether polyol (a)(ii);
and
(iii) one or more polyether polyols having a hydroxyl number of about 47 to about 300, a nominal functionality of greater than 2 to about 8, and containing from about 5 to about 45% by weight of copolymerized oxyethylene, based on the total weight of the polyether polyol (a)(iii);
wherein (a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% by weight of the balance comprises component (iii).
and, optionally,
(II) blending the in-situ formed polyol blend (a) with
(b) up to 80% by weight, based on 100% by weight of components (a) and (b), of one or more polyether polyols having an average functionality of 2 to 8, a hydroxyl number of 20 to 300 and containing at least 50% of copolymerized oxyethylene, based on the total by weight of the polyether polyol(b).

DETAILED DESCRIPTION

Figure 1A:
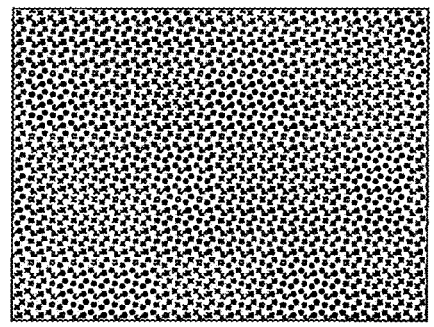
FIG. 1A is a cross-sectional view of a standard foam block which is representative of one embodiment of the present invention.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The nominal molecular weight is the nominal number average equivalent weight multiplied by the starter functionality. The nominal hydroxyl number equals 56,100 divided by the nominal equivalent weight.

As used herein, the term "nominal functionality" refers to the functionality of a polyether polyol which is based solely on the functionality of the starter compound or initiator used in preparing the polyether polyol. The nominal functionality is typically used to describe the functionality of a specific compound.

As used herein, the term "average functionality" refers to the average number of reactive groups (e.g. hydroxyl, amine, etc.) which are present per molecule of the polyether polyol or polyether polyol blend being described. This term is typically used when either a polyether polyol is prepared from two or more starter compounds or initiators that have different functionalities and/or when a blend of polyether polyols is used in which the individual polyether polyols have different functionalities.

All hydroxyl numbers (i.e. OH numbers) herein were determined according to ASTM D4274-11, and are reported in mg KOH/g polyol.

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene (S) to acrylonitrile (AN) in the total polymer. One skilled in the art will recognize that this is an analytical confirmation of the main mechanism for controlling the S/AN ratio, which is the wt % of monomers in the total reactor feed.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provide an isocyanate index of 100%.

As used herein, the term "viscoelastic foam" or "viscoelastic polyurethane foam" refers to low-resilience polyurethane foam and is commonly referred to as memory foam. These foams typically provide uniform support of any weight placed on the foam targeted to relieve pressure points, and the foam recovers slowly to its original shape once the weight is removed. These foams are mainly used for bedding, pillows, etc.

Figure 1B:
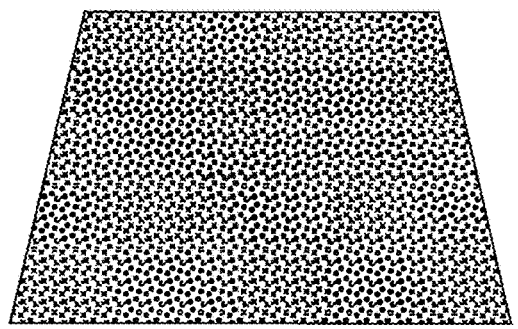
FIG. 1B is a cross-sectional view of a foam block which illustrates cold flow.
Figure 1C:
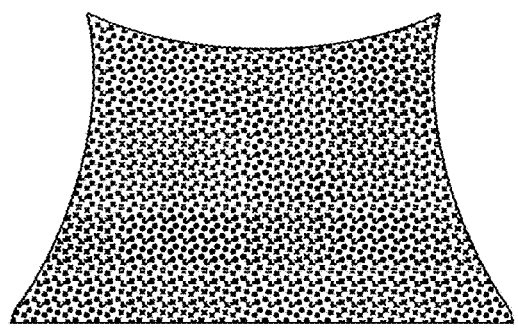
FIG. 1C is a cross-sectional view of a foam block which illustrates dishing.

As used herein, the definition of cold flow is the distortion, deformation or dimensional change which takes place in materials under continuous load at ambient temperature (source: CRC Press LLC, 1989). By "continuous load" it is meant the slabstock foam's own weight. A foam block which exhibits cold flow is shown in FIG. 1B. Such foams have a trapezoidal shape.

As used herein, the term dishing is used to refer to the distortion, deformation or dimensional change which takes place in materials under continuous load at ambient temperature similarly to cold flow but dishing specifically refers to foams or materials in which the sides and top of the foam block pucker as shown in FIG. 10.

The polyol blend (a) has an overall hydroxyl number of from about 56 to about 250 and an average functionality of greater than about 2. This polyol blend may have a hydroxyl number of at least about 56, or at least about 70, or at least about 80, or at least about 90. This polyol blend may also have a hydroxyl number of about 250 or less, or less than 120, or about 118 or less, or about 110 or less. The in-situ formed polyol blend (a) may have a hydroxyl number ranging between any combination of these upper and lower values, inclusive, such as from at least about 56 to about 250 or less, or from at least about 70 to less than 120, or from at least about 80 to less than or equal to 118, or from at least about 90 to about 110.

Polyol blend (a) also typically has an average functionality of greater than about 2. This polyol blend may have an average functionality of greater than about 2, or at least about 2.1. The average functionality of this polyol blend may also be about 6 or less, or about 4 or less. The polyol blend (a) may have an average functionality ranging between any combination of these upper and lower values, inclusive, such as greater than about 2 to about 6 or less, or at least about 2.1 to about 4 or less.

Suitable (2) isocyanate-reactive components for the viscoelastic polyurethane foams and process of preparing the viscoelastic foams comprise:
(a) from 20 to 100% by weight, based on 100% by weight of components (2)(a) and (2)(b), of a polyol blend having a hydroxyl number of from about 56 to about 250 (or from at least about 70 to less than 120, or from at least about 80 to less than or equal to 118, or from at least about 90 to about 110), an average functionality greater than about 2, and comprising:
  (i) one or more monofunctional polyethers having a hydroxyl number of less than or equal to 56, and containing less than or equal to 20% by weight of copolymerized oxyethylene, based on 100% by weight of (a)(i);
  (ii) one or more polyether polyols having a hydroxyl number of from 47 to 300, a nominal functionality of 2, and containing from about 5 to about 45% of copolymerized oxyethylene, based on the total weight of the polyether polyol (a)(ii);
  and
  (iii) one or more polyether polyols having a hydroxyl number of about 47 to about 300, an nominal functionality of greater than 2 to about 8, and containing from about 5 to about 45% by weight of copolymerized oxyethylene, based on the total weight of the polyether polyol (a)(iii);
  wherein (2)(a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% of the balance comprises component (iii);
and
(b) up to 80% by weight, based on 100% by weight of components (2)(a) and (2)(b), of one or more polyether polyols having an average functionality of 2 to 8, a hydroxyl number of 20 to 300 and comprising at least 50% of copolymerized oxyethylene, based on the total weight of the polyether polyol (2)(b).

In another embodiment, the relative amounts of (a) and (b) are 20% to 100% by weight of (a) and up to 80% by weight of (b), or from 85% to 99% by weight of (a) and from 1% to 15% by weight of (b), based on 100% by weight of isocyanate-reactive component (2).

In one embodiment of the invention when the NCO Index of the overall system is greater than or equal to about 105, the isocyanate-reactive component comprises at least about 3% by weight of component (b), or at least about 5% by weight of component (b), based on 100% by weight of component (2).

Suitable monofunctional polyethers for component (a)(i) include those monols having a hydroxyl number of less than or equal to 56, or of less than or equal to 28.

Suitable starters for (a)(i) include polyoxyalkylene monols formed by addition of multiple equivalents of epoxide to low molecular weight monofunctional starters such as, for example, methanol, ethanol, phenols, allyl alcohol, longer chain alcohols, etc., and mixtures thereof. Examples of suitable longer chain alcohols include $C_{12}$, $C_{13}$, $C_{14}$ and/or $C_{15}$ monols, which may be used individually or as mixtures. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group. Suitable monofunctional starters include those monols described in, for example, U.S. Pat. Nos. 6,391,935 and 6,821,308, the disclosures of which are hereby incorporated by reference.

In one embodiment, the polyoxyalkylene monol starter comprises a polyoxypropylene monol having a hydroxyl number of less than or equal to 56. These compounds facilitate DMC catalyzed addition of epoxide and provide good build ratios for the production of polyol blends (a).

The monofunctional polyethers may also be characterized in one embodiment as containing up to about 20% by weight of copolymerized oxyethylene, based on the total weight of the monofunctional polyether. This weight percentage includes the initiator or starter and all of the added epoxide (s). These monofunctional polyethers may contain less than or equal to about 20% by weight, or less than or equal to about 15% by weight, or less than or equal to about 10% by weight, based on 100% by weight of the monofunctional polyether, of copolymerized oxyethylene. These monofunctional polyethers may also contain more than 0%, or at least about 2% or at least about 5%, based on the total weight of the monofunctional polyether, of copolymerized oxyethylene. The amount of copolymerized oxyethylene present in the monofunctional polyethers may vary between any combination of these upper and lower values, inclusive, such as, of more than 0% to less than or equal to about 20%, or at least about 2% to less than or equal to about 15%, or at least about 5% to less than or equal to about 10% by weight.

The monofunctional polyethers can have virtually any desired arrangement of oxyalkylene units with the proviso that these contain less than 20% of copolymerized oxyethylene, based on the total weight of the monofunctional polyether. This weight percentage includes the initiator or starter and all of the added epoxide(s). In general, all of the oxyethylene units are not concentrated at the end of the polyoxyalkylene monols such that the primary hydroxyl group content of the monol is less than 23% by weight. Some examples of suitable monofunctional polyethers include PO homopolymers, block EO-PO copolymers, random EO/PO copolymers, PO polymers that are "tipped" with EO or with a mixture of EO and PO are possible but not preferred. These "tipped" PO polymers should use a mixture of EO and PO to achieve a particular oxyethylene content and/or a desired primary hydroxyl content (less than 23%), or any other desired configuration. The so-called PO homopolymers are suitable with the proviso that they satisfy the above described amounts of copolymerized oxyethylene.

Suitable polyether polyols for component (a)(ii) typically have a hydroxyl number of from about 47 to about 300, and a nominal functionality of 2. These polyether polyols may have hydroxyl numbers of from at least about 47, or from at least about 70. The polyether polyols may also have hydroxyl numbers of less than or equal to about 300, or of less than or equal to 240. Suitable polyether polyols may also have a hydroxyl number ranging between any combination of these upper and lower values, inclusive, of from at least about 47 to about 300, or from at least about 70 to about 240. These polyether polyols (ii) may be prepared from low molecular weight starters such as, for example, propylene glycol, dipropylene glycol, ethylene glycol, tripropylene glycol, water, methyl-1,3-propanediol, and the like, and mixtures thereof.

Suitable polyether polyols for component (a)(ii) contain from about 5 to about 45% by weight of copolymerized oxyethylene. These polyether polyols may contain at least about 5%, or at least about 10%, or at least about 15%, of copolymerized oxyethylene, based on the total weight of the polyether polyol (a)(ii). These polyether polyols may contain about 45% or less, or about 40% or less, or about 35% or less of copolymerized oxyethylene, based on the total weight of the polyether polyol (a)(ii). The total weight of the polyether polyol includes the starter or initiator, and the all of the added epoxide(s). Suitable polyether polyols herein may contain any amount of copolymerized oxyethylene between the above disclosed upper and lower values, inclusive, unless otherwise stated, such as at least about 5% to about 45% by weight or less, or at least about 10% to about 40% by weight or less, or at least about 15% to about 35% by weight or less.

These polyether polyols (a)(ii) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration.

Suitable polyether polyols for component (a)(iii) typically have a hydroxyl number of from about 47 to about 300, a nominal functionality of greater than 2 to about 8. These polyether polyols may also have hydroxyl numbers of from at least about 47, or from at least about 70. The polyether polyols may also have hydroxyl numbers of less than or equal to 300, or of less than or equal to 240. Suitable polyether polyols may also have a hydroxyl number ranging between any combination of these upper and lower values, inclusive, of from at least about 47 to about 300, or from at least about 70 to about 240. The polyether polyols may also have a nominal functionality of greater than 2, or of at least about 3. The nominal functionality of the polyether polyols may also be less than or equal to about 8, or less than or equal to about 6. Suitable polyether polyols may have a nominal functionality ranging between any combination of these upper and lower values, inclusive, such as from greater than 2 to about 8, or from at least about 3 to about 6. These polyether polyols (iii) may be prepared from low molecular weight starters such as, for example, glycerin, trimethylolpropane, pentaerythritol, sucrose, sorbitol, and the like, and mixtures thereof.

Suitable polyether polyols for component (a)(iii) contain from about 5 to about 45% by weight of copolymerized oxyethylene. These polyether polyols may contain at least about 5%, or at least about 10%, or at least about 15%, of copolymerized oxyethylene, based on the total weight of the polyether polyol (a)(iii). These polyether polyols may contain about 45% or less, or about 40% or less, or about 35% or less of copolymerized oxyethylene, based on the total weight of the polyether polyol (a)(iii). The total weight of the polyether polyol includes the starter or initiator, and the all of the added epoxide(s). Suitable polyether polyols herein may contain any amount of copolymerized oxyethylene between the above disclosed upper and lower values, inclusive, unless otherwise stated, such as at least about 5% to about 45% by weight or less, or at least about 10% to about 40% by weight or less, or at least about 15% to about 35% by weight or less.

These polyether polyols (a)(iii) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration.

In accordance with the invention, the polyol blend (a) comprises from about 20% to about 50%, or from about 25 to about 45% by weight of (i) the monofunctional polyethers and the balance of the polyol blend comprises components (ii) and (iii), in which from about 10 to about 90%, or from about 15 to 85% by weight of the balance comprises component (ii) and from about 90% to about 10%, or from about 85 to 15% by weight of the balance comprises component (iii).

The isocyanate-reactive component may additionally comprise (b) one or more polyether polyols. Suitable polyether polyols (b) include those polyols which have an average functionality of from 2 to 8, a hydroxyl number of at least about 20 to about 300 or less, and contain at least 50% of copolymerized oxyethylene, based on the total by weight of the polyether polyol (b). As previously stated, these polyether polyols are different than the polyether polyols (a)(ii) and (a)(iii). Suitable polyether polyols for component (b) may commonly be referred to as cell opening polyols.

These polyether polyols for component (b) may have hydroxyl numbers of at least about 20 mg KOH/g, or at least about 30 mg KOH/g, or at least about 35 mg KOH/g. In addition, the polyether polyols generally have hydroxyl numbers of about 300 mg KOH/g or less, or about 170 mg KOH/g or less, or about 50 mg KOH/g or less. The suitable polyether polyols of the present invention may be characterized by a hydroxyl number between any combination of these upper and lower values, inclusive, unless otherwise stated, such as, at least about 20 to about 300 mg KOH/g or less, or at least about 30 to about 170 mg KOH/g or less, or at least about 35 mg KOH/g to about 50 mg KOH/g or less.

The average functionality of these polyether polyols (b) ranges is at least 2, or at least about 2.5. The average functionality is also typically about 8 or less, or about 6 or less. The average functionality of the polyether polyols (b) may range between any combination of these upper and lower values, inclusive, such as at least about 2 to about 8 or less, or at least about 2.5 to about 6 or less.

Suitable polyether polyols used as component (b) may also contain at least 50% to about 99% by weight or less of copolymerized oxyethylene, based on the total weight of the polyether polyol. The total weight of the polyether polyol includes the starter or initiator, and the all of the added epoxide(s). These polyether polyols may contain at least about 50%, or at least about 60% or at least about 70% by weight, of copolymerized oxyethylene, based on the total weight of the polyether polyol. These polyether polyols may also contain about 99% or less, or about 90% or less, or about 85% or less of copolymerized oxyethylene, based on the total weight of the polyether polyol. Suitable polyether polyols herein may contain any amount of copolymerized oxyethylene between the above disclosed values, inclusive, such as at least about 50% to about 99% or less, or at least about 60% to about 90% or less, or at least about 70% to about 85% by weight or less, of copolymerized oxyethylene.

Some examples of suitable polyether polyols for component (b) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (b) include low molecular weight starters such as, for example, glycerin, propylene glycol, dipropylene glycol, ethylene glycol, trimethylolpropane, sucrose, sorbitol, tripropylene glycol, water, methyl-1,3-propanediol, pentaerythritol, and the like, and mixtures thereof.

Suitable epoxides for component (b) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

These polyether polyols can have any desired arrangement of oxyalkylene units with the proviso that they contain at least 50% of copolymerized oxyethylene, based on the total weight of the polyether polyol. Thus, the polyether polyols (b) can be EO homopolymers, block EO-PO copolymers, EO-capped polyoxypropylenes, PO capped polyoxyethylenes, random EO/PO copolymers, PO polymers that are "tipped" with a mixture of EO and PO to achieve the desired amount of copolymerized oxyethylene and/or a particular primary hydroxyl content, or any other desired configuration.

The isocyanate-reactive component herein may additionally comprise components (c) and/or (d). Components (c) and/or (d) may be present in amounts of from 0 to about 50% by weight, or from about 1 to about 40% by weight, based on 100% by weight of components (a), (b), (c) and (d).

In one embodiment, these isocyanate-reactive components additionally comprise (c) one or more polyether polyols having an OH number of from about 10 to about 300, an average functionality of from about 2 to about 8, and containing from 0 to 45% by weight of copolymerized oxyethylene, based on the total weight of component (c).

Suitable compounds to be used as polyether polyols (c) include those polyols which have an average functionality of at least about 2 to about 8 or less, a hydroxyl number of at least about 10 to about 300 or less, and contain from 0% to about 45% by weight of copolymerized oxyethylene, based on the total weight of the polyether polyol (c). These polyether polyols are different than the polyether polyols (a)(ii) and the polyether polyols (a)(iii).

These polyether polyols for component (c) may have hydroxyl numbers of from at least about 10 mg KOH/g, or at least about 20 mg KOH/g, or at least about 25 mg KOH/g. In addition, the polyether polyols generally have hydroxyl numbers of about 300 mg KOH/g or less, or about 150 mg KOH/g or less, or about 75 mg KOH/g or less. The suitable polyether polyols of the present invention may be characterized by a hydroxyl number between any combination of these upper and lower values, inclusive, unless otherwise stated, such as, from at least about 10 to about 300 mg KOH/g or less, or at least about 20 to about 150 mg KOH/g or less, or at least about 25 mg KOH/g to about 75 mg KOH/g or less.

The average functionality of these polyether polyols (c) ranges from at least about 2 to about 8 or less. These polyether polyols may also have an average functionality of at least about 2, or at least about 2.5, or at least about 3. These polyether polyols may have an average functionality of 8 or less, or of 6 or less, or of 4 or less. In addition, these polyether polyols may have an average functionality between any combination of these upper and lower values, inclusive, such as at least about 2 to about 8 or less, or at least about 2.5 to about 6 or less, or at least about 3 to about 4 or less.

Some examples of suitable polyether polyols for component (c) include those compounds which are conveniently made by reacting compounds having two or more active hydrogens (e.g. glycols, triols, tetrols, hexols, polyfunctional amines and other polyfunctional starters known to those in the art) with one or more equivalents of an epoxide as described earlier. Examples of suitable starters for these polyether polyols (c) include low molecular weight starters such as, for example, glycerin, propylene glycol, dipropylene glycol, ethylene glycol, trimethylolpropane, sucrose, sorbitol, tripropylene glycol, water, methyl-1,3-propanediol, pentaerythritol, and the like, and mixtures thereof.

Suitable epoxides for component (c) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

In one embodiment, the isocyanate-reactive component may additionally comprise (d) one or more filled polyols which are also known as polymer polyols. Examples of suitable filled polyols for the invention include, for example, (i) styrene/acrylonitrile polymer polyols, (ii) polyisocyanate polyaddition (PIPA) polyols which are dispersions of polyurethanes formed by the in-situ reaction of an isocyanate and an alkanolamine, (iii) polyhydrazodicarbonamide dispersion polyols (also known as PHD polyols), and (iv) mixtures thereof.

Suitable (i) SAN polymer polyols herein are prepared by free radical polymerization of monomers (i.e. styrene and acrylonitrile) in a polyol carrier (or base polyol) to produce a free radical polymer dispersed in the polyol carrier (or base polyol). Conventionally, the solids content of SAN polymer polyols is from about 5% up to about 60% by weight of solids, based on the total weight of the SAN polymer polyol composition. The solids content may be at least about 5%, or at least about 10% by weight of solids, based on the total weight of the SAN polymer polyol composition. The solids content may also be about 60% by weight or less, or about 50% by weight or less, based on the total weight of the SAN polymer polyol composition. The amount of solids content may range between any combination of these upper and lower values, inclusive, such as from about 5% to about 60%, or from about 10% to about 50% by weight of solids, based on the total weight of the SAN polymer polyol composition.

Examples of suitable SAN polymer polyols to be used as component (d) herein include those SAN polymer polyols disclosed in, for example, but are not limited to, U.S. Pat. Nos. 5,321,077, 5,324,774, 5,364,906, 5,358,984, 5,453,469, 5,488,085, 5,496, 894, 5,554,662, 5,594,066, 5,814,699, 5,824,712, 5,916,994, 5,995,534, 5,990,185, 6,117,937, 6,455,603, 6,472,447, 6,624,209, 6,713,599, 6,756,414, 7,179,882, 7,759,423, etc., the disclosures of which are hereby incorporated by reference.

The SAN polymer polyols suitable for the present invention are prepared by the in-situ polymerization of acrylonitrile and styrene, in a base polyol. Suitable base polyols may be conventional polyether polyols, polyester polyols, poly(oxyalkylene) polyols, etc. Methods for preparing SAN polymer polyols are known and described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference.

One suitable SAN polymer polyol to be used as component (d) in the present invention comprises the free radical polymerization product of styrene and acrylonitrile in a base polyol, wherein the base polyol has a nominal functionality of about 3, a molecular weight of about 4750, and an OH number of about 35. The solids content of this SAN polymer polyol is about 43% solids, in which the styrene to acrylonitrile content is about 64% to 36%.

Another suitable SAN polymer polyol for component (d) in the present invention comprises the free radical polymerization product of styrene and acrylonitrile in a base polyol, wherein the base polyol has a nominal functionality of about 3, a molecular weight of about 3000, and an OH number of about 56. The solids content of this SAN polymer polyol is about 49% solids, in which the styrene to acrylonitrile content is about 67% to 33%.

Suitable polyisocyanate polyaddition (PIPA) polyols for component (d) contain polyurethane particles dispersed in a polyol carrier (i.e. base polyol). The polyurethane particles in PIPA polyols are formed in-situ by the reaction of an isocyanate with an alkanolamine (e.g., triethanolamine). The solids content of the PIPA polyols may typically range from 5% up to about 60% by weight, based on the total weight of the PIPA composition. The solids content may be at least about 5%, or at least about 10% by weight of solids, based on the total weight of the PIPA composition. The solids content may also be about 60% by weight of less, or about 50% by weight or less, based on the total weight of the PIPA composition. The amount of solids content may range between any combination of these upper and lower values, inclusive, such as from about 5% to about 60%, or from about 10% to about 50% by weight of solids, based on the total weight of the PIPA composition.

Examples of suitable PIPA polyols can be found in, for example, U.S. Pat. Nos. 4,374,209 and 5,292,778, the disclosures of which are herein incorporated by reference.

Suitable polyhydrazodicabonamide polyols (which are also commonly referred to as PHD polyols or PHD dispersion polyols) to be used as component (d) of the present invention include, for example, those compounds which are typically prepared by the in-situ polymerization of an isocyanate mixture with an amine group containing compound such as, a diamine and/or a hydrazine, in a base polyol. Suitable base polyols typically comprise polyether polyols and polyoxyalkylene polyols. Methods for preparing PHD polymer polyols are described in, for example, U.S. Pat. Nos. 4,089,835 and 4,260,530, the disclosures of which are hereby incorporated by reference.

PHD polyols typically have solids contents within the range of from about 3 to about 30 weight %, based on the total weight of the PHD polyol. The solids content of the PHD polyols may be from at least about 3%, or from at least about 5% by weight, based on the total weight of the PHD polyol. The solids content of the PHD polyols may also be about 30% or less, or about 25% by weight or less, based on the total weight of the PHD polyol. The PHD polyols may have a solids content that ranges between any combination of these upper and lower values, inclusive, such as from about 3% to about 30% by weight, or from about 5 to about 25% by wt., based on the total weight of the PHD polyol.

As previously stated, PHD polyols are typically prepared by the in-situ polymerization of an isocyanate mixture in a polyol. More specifically, the isocyanate mixture typically comprises about 80 parts by weight, based on the total weight of the isocyanate mixture, of 2,4-toluene diisocyanate, and about 20 parts by weight, based on the total weight of the isocyanate mixture, of 2,6-toluene diisocyanate.

Suitable amine group containing compounds to be polymerized with the isocyanate compound include in preparing the PHD polyols, for example, compounds such as polyamines, hydrazines, hydrazides, ammonia or mixtures of ammonia and/or urea and formaldehyde.

Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylene diamine; hexamethylene diamine; dodecamethylene diamine; trimethyl diaminohexane; N,N'-dimethyl-ethylenediamine; 2,2'-bisaminopropyl-methylamine; higher homologues of ethylene diamine, such as diethylene triamine, triethylene tetramine and tetraethylene pentamine; homologues of propylene diamine, such as dipropylene triamine, piperazine, N,N'-bis-aminoethyl-piperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines; condensates of aniline and formaldehyde; tolylene diamines; the bis-aminomethylbenzenes and derivatives of the above mentioned aromatic amines monoalkylated on one or both nitrogen atoms. The polyamines generally have a relative molecular mass of from 48 to 10,000 Daltons. They may also have relative molecular masses of 60 to 1000 Daltons, or of 62 to 200 Daltons.

The hydrazines used may be hydrazine itself or monosubstituted or N,N'-disubstituted hydrazines. The substituents may be $C_1$ to $C_6$ alkyl groups, cyclohexyl groups or phenyl groups. The hydrazines generally have a relative molecular mass of from 32 to 200 Daltons. Hydrazine itself is suitable for the invention herein.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid; the esters of a hydrazine monocarboxylic acid with dihydric or higher hydric alcohols and phenols such as ethanediol, propane-1,2-diol, butane-1, 2-diol, -1,3-diol and -1,4-diol, hexanediol, diethyleneglycol, triethyleneglycol, tetraethyleneglycol, dipropyleneglycol, tripropyleneglycol and hydroquinone; and the amides of hydrazinomonocarboxylic acid (semicarbazides), e.g. with the above mentioned diamines and polyamines. The hydrazides generally have a relative molecular mass of from 70 to 10,000 Daltons, or from 75 to 1000 Daltons, or from 90 to 500 Daltons. Any combination of these upper and lower limits for molecular weights can be used for the hydrazides herein.

In special cases, a proportion of isocyanates or amines, hydrazines and hydrazides which have an average functionality higher than 2 may also be used, especially in combination with the corresponding monofunctional compounds.

In accordance with the present invention, preferred base polyols for preparing the PHD polyols comprise polyether polyols and poly(oxyalkylene) polyols.

PHD polymer modified polyols are typically prepared by the in-situ polymerization of an isocyanate mixture with a diamine and/or hydrazine in a base polyol, preferably, a polyether polyol. Methods for preparing PHD polymer polyols are described in, for example, U.S. Pat. Nos. 4,089,835, 4,260,530 and 4,324,715, the disclosures of which are hereby incorporated by reference.

In one embodiment, the polyol blend (a) may be continuously added and mixed in-line prior to the foam mixhead.

In another embodiment, the polyol blend (a) may comprise an in-situ formed polyol blend.

The polyol blend (a) may be also comprise a mixture that is prepared by combining components (a)(i), (a)(ii) and (a)(iii).

The in-situ formed polyol blends suitable for use as (a) may be formed by
A) introducing into a reaction vessel a mixture comprising:
 (1) an initial starter ($S_i$) comprising one or more monofunctional compounds having a hydroxyl number of less than about 56, and
 (2) a DMC (double metal cyanide) catalyst,
B) feeding
 (1) an epoxide comprising propylene oxide and ethylene oxide in a weight ratio of from 100:0 to 20:80, into the reaction vessel;
C) allowing the epoxide mixture and the initial starter ($S_i$) to react and continue polymerizing by feeding the epoxide until the equivalent weight of the monofunctional compound is increased by at least 10% by weight and reaches a value between about 1,500 and about 6,000;
D) continuously adding
 (1) one or more low molecular weight starters ($S_c$) having a functionality of greater than 2 to about 6, and an equivalent weight of about 28 to about 400
 into the reaction vessel while continuing to feed epoxide;
E) completing addition of the continuous starter ($S_c$);
and
F) allowing the mixture to continue to polymerize in the reaction vessel thereby forming (a) an in-situ formed polyol blend having an overall hydroxyl number of from about 56 to about 250, an average functionality of greater than 2, and which comprises
 (i) one or more monofunctional polyethers having a hydroxyl number of less than or equal to 56, and containing less than 20% by weight of copolymerized oxyethylene, based on 100% by weight of the monofunctional polyethers (a)(i);
 (ii) one or more polyether polyols having a hydroxyl number of 47 to 300, a nominal functionality of 2 and containing from about 5 to about 45% by weight of copolymerized oxyethylene, based on 100% by weight of the polyether polyols (a)(ii);
 and
 (iii) one or more polyether polyols having a hydroxyl number of about 47 to about 300, a nominal functionality of greater than 2 to about 8, and containing from about 5 to about 45% by weight of copolymerized oxyethylene, based on 100% by weight of the polyether polyols (a)(iii);
 wherein (a) said polyol blend comprises from 20 to 50% by weight of (i) said monofunctional polyether monols and the balance of (a) comprises components (ii) and (iii) in which from 10 to 90% by weight of the balance comprises component (ii) and from 90 to10% by weight of the balance comprises component (iii);
and, optionally,
(II) combining the resultant in-situ produced polyol blend (a) with
 (b) up to 80% by weight, based on 100% by weight of components (a) and (b), of at least one polyether polyol having an average functionality of 2 to 8, a hydroxyl number of 20 to 300 and containing at least 50% of copolymerized oxyethylene, based on 100% by weight of the polyether polyol (b).

In general, any epoxide polymerizable using DMC catalysis can be used in the in-situ production of the polyol blend comprising a monofunctional polyether and two different polyether polyols. Suitable epoxides include ethylene oxide, propylene oxide, butylene oxides (e.g., 1,2-butylene oxide, isobutylene oxide), styrene oxide, and the like, and mixtures thereof. Polymerization of epoxides using DMC catalysts and hydroxyl-containing starters results in polyether polyols, as is well understood in the art.

Other monomers that will copolymerize with an epoxide in the presence of a DMC catalyst may be included in the process of the invention to make other types of epoxide polymers. Some examples include epoxides copolymerize with oxetanes as described in U.S. Pat. No. 3,404,109, the disclosure of which is herein incorporated by reference, to give polyethers, or with anhydrides to give polyesters or polyetheresters as described in U.S. Pat. Nos. 5,145,883 and 3,538,043, the disclosures of which are herein incorporated by reference, or with carbon dioxide to form polyethercarbonate polyols such as those described in U.S. Pat. Nos. 4,826,887, 4,826,952, 4,826,953, 6,713,599, 7,977,501, 8,134,022, 8,324,419, 8,946,466 and 9,249,259, the disclosures of which are herein incorporated by reference, and U.S. Published Patent Application 2015/0232606.

In accordance with this process, an initially charged starter ($S_i$) is used, and the initially charged starter ($S_i$) is different than the continuously added starter ($S_c$). The initially charged starter, $S_i$, is comprised of, either totally or in large part, one or more compounds having one active hydrogen per molecule that can serve as a site for epoxide addition. The preferred starters are polyether monols formed by addition of multiple equivalents of epoxide to low molecular weight monofunctional starters such as, for example, methanol, ethanol, phenols, allyl alcohol, longer chain alcohols, etc., and mixtures thereof. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group.

One suitable class of polyether monol starters, $S_i$, includes polyoxypropylene monols having a hydroxyl number of less than or equal to about 56. These compounds facilitate DMC catalyzed addition of epoxide and provide suitable build ratios for the production of the in-situ formed polyether polyol blends herein.

In the process of the present invention, the quantity of an $S_i$ used depends on many factors, including, for example, the reactor dimensions, the identity of the $S_i$, the equivalent weights of the $S_i$ and of the target product, the equivalent weight of the $S_c$, and other factors. In general, the amount of $S_i$ is within the range of about 2 to about 75 mole % of the total moles of $S_i$ and $S_c$. The total amount of starter ($S_t$) equals the sum of the amount of continuously added starter ($S_c$) plus the amount of initially charged starter ($S_i$). Thus, $S_t = S_c + S_i$.

Suitable catalysts comprise double metal cyanide (DMC) catalysts. Any DMC catalyst known in the art is suitable for use in the process of the present invention. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the disclosures of which are incorporated herein by reference. One suitable type of DMC catalysts are zinc hexacyanocobaltates.

The DMC catalyst includes an organic complexing agent. As disclosed in the preceding references, the complexing agent is needed for an active catalyst. Suitable complexing agents are water-soluble heteroatom-containing organic compounds that can complex with the DMC compound, as well as water-soluble aliphatic alcohols. An example of a suitable aliphatic alcohol is tert-butyl alcohol. The DMC catalyst may include, in addition to the organic complexing agent, a polyether, as is described in U.S. Pat. No. 5,482,908, the disclosure of which is herein incorporated by reference.

Suitable DMC catalysts for use in the process are highly active catalysts such as those described in U.S. Pat. Nos. 5,482,908 and 5,470,813, the disclosures of which are herein incorporated by reference. High activity allows the catalysts to be used at very low concentrations, and possibly at concentrations which are low enough to overcome any need to remove the catalyst from the finished blends of in-situ formed polyol blends.

The process of the invention also requires a continuously added polyfunctional starter ($S_c$). Conventional processes for making polyether polyols, including KOH-catalyzed and DMC-catalyzed processes, charges the catalyst and all of the starter to be used to the reactor at the start of the polymerization, and then adds the epoxide continuously. In the process of forming an in-situ formed polyol blend suitable for the invention, the DMC catalyst and an initial monofunctional starter ($S_i$) are charged to the reactor followed by epoxide feed and polymerization until the monol reaches the desired equivalent weight. At this point, the feed of continuously added polyfunctional starter ($S_c$) is begun and it proceeds at a continuous controlled rate relative to the continuing epoxide feed until the addition of the continuous starter ($S_c$) is completed. Epoxide feed is continued until the desired overall OH number, is reached. The $S_c$ may be mixed with the epoxide and added, or it may be added as a separate stream.

The $S_c$ is typically a low molecular weight polyol or a blend of low molecular weight polyols. Low molecular weight polyols as defined in this application have from about 2 hydroxyl groups to about 8 hydroxyl groups. It also may be beneficial to add more than one $S_c$ having different functionalities either simultaneously or sequentially. The functionality of the $S_c$ or multiple $S_c$ should be chosen such at the average functionality of the resultant polyol is greater than 2.0 up to about 6, or from about 2.5 up to about 3. These low molecular weight polyols may have at least about 2 hydroxyl groups, or greater than 2 hydroxyl groups, or at least about 2.5 hydroxyl groups. These low molecular weight polyols may also have about 8 hydroxyl groups or less, or about 6 hydroxyl groups or less, or about 3 hydroxyl groups or less. The low molecular weight polyols used for the $S_c$ may contain any number of hydroxyl groups which ranges between any combination of these upper and lower values, inclusive, such as from at least 2 hydroxyl groups to about 8 hydroxyl groups or less, or greater than about 2 to about 6, or at least about 2.5 to about 3 hydroxyl groups or less.

Suitable low molecular weight polyols for the $S_c$ have a nominal functionality of greater than 2 to about 8 and an equivalent weight of about 28 to about 400.

Examples of suitable low molecular weight polyols include compounds such as, for example, glycerin, propylene glycol, dipropylene glycol, ethylene glycol, trimethylolpropane, sucrose, sorbitol, tripropylene glycol, and the like, and mixtures thereof. In one embodiment, the continuously added starter comprises propylene glycol and glycerin. Low molecular weight polyether polyols prepared by multiple epoxide addition to these polyols or other starters with two or more active hydrogens may also be employed as $S_c$.

The $S_c$ can also be other compounds having at least two active hydrogens per molecule, which are known to be suitable initiators for conventional DMC-catalyzed epoxide polymerizations, including compounds such as, for example, alcohols, thiols, aldehydes and ketones containing enolizable hydrogens, malonic esters, phenols, carboxylic acids and anhydrides, aromatic amines, acetylenes, and the like, and mixtures thereof. Examples of suitable active hydrogen-containing compounds appear in U.S. Pat. Nos. 3,900,518, 3,941,849, and 4,472,560, the disclosures of which are incorporated herein by reference.

The amount of $S_c$ used is at least about 25 mole percent of the total amount of starter used.

$$\text{mole \% } S_c = \left(\frac{\text{moles } S_c}{\text{moles } S_c + \text{moles } S_i}\right) \times 100$$

As described previously, a wide variety of epoxides can be employed in the current process. Propylene oxide and ethylene oxide are the most commonly used epoxides. A unique feature of the current process is that the compositions of the epoxide can be varied to control the composition of the polyether monol and polyether polyol constituents in the final product. For example, propylene oxide can be added alone during polymerization of the monol, prior to the start of the addition of the $S_c$, the continuously added starter. After $S_c$ addition is started, a blend of ethylene oxide and propylene oxide can be fed to yield a high functionality polyether polyol comprised of a poly(oxyethylene-oxypropylene) copolymer. Because oxide addition via DMC catalysis occurs predominantly on the lower equivalent weight polyether polyol, the polyether monol component can remain largely poly(oxypropylene). By reversing these sequences, the polyether monol could be produced with higher poly(oxyethylene) content and the polyether polyol could be predominantly poly(oxypropylene).

The epoxide composition may also be varied during the initial polymerization of the monol and/or at some point during and/or after the addition of $S_c$. This provides flexibility for controlling the distribution of oxyethylene or oxypropylene within the monofunctional polyether and polyether polyols and allows some control of the primary versus secondary hydroxyl functionality of the monofunctional polyether and polyether polyols, and thus, the relative reactivity of the constituents in the final composition. In this way, it is possible to design the product to meet the reactivity and performance requirements of the intended applications such as viscoelastic polyurethane foams.

The in-situ formed polyol blend (a) essentially corresponds to the polyol blend (a) described herein above, and is characterized by the same overall hydroxyl numbers and average functionalities.

As previously described, the in-situ formed polyol blends (a) comprise (i) one or more monofunctional polyols having a hydroxyl number of less than or equal to 56 and containing less than or equal to 20% by weight of copolymerized oxyethylene, (ii) one or more polyether polyols having a hydroxyl number of from 47 to 300, a nominal functionality of 2, and containing from about 5 to about 45% by weight of copolymerized oxyethylene, and (iii) one or more polyether polyols having a hydroxyl number of about 47 to about 300, a nominal functionality of greater than 2 to about 6, and containing from about 5 to about 45% by weight of copolymerized oxyethylene. These individual components (i), (ii) and (iii) of the in-situ formed polyol blend correspond essentially to the individual components (i), (ii) and (iii) of the polyol blend (a) described previously with respect to hydroxyl number, nominal functionality and content of copolymerized oxyethylene.

Suitable polyether polyols to be used as component (II)(b) which may optionally be combined with the in-situ prepared polyol blend may have an average functionality of 2 to 8, a hydroxyl number of 20 to 300 and comprise at least 50% of copolymerized oxyethylene, based on 100% by weight of the polyether polyol (II)(b).

These polyether polyols (b) suitable for the in-situ formed blend correspond essentially to those polyether polyols (b) which are suitable for adding to the polyol blend (a) above and are previously described with respect to the hydroxyl number, average functionality and content of copolymerized oxyethylene.

In one embodiment, the in-situ formed polyol blends (a) may additionally comprise (II)(c) one or more polyether polyols having an OH number of from about 10 to about 300 and an average functionality of about 2 to about 8, and/or (d) one or more filled polyols. The one or more polyether polyols (c) and one or more filled polyols (d) suitable herein correspond essentially to those polyether polyols (c) and filled polyols (d) described previously with respect to the polyol blends (a) in terms of hydroxyl number, functionality, etc.

The process for the production of a viscoelastic polyurethane foam comprises reacting (1) an isocyanate-functional component comprising toluene diisocyanate, with (2) an isocyanate-reactive component in the presence of components comprising a blowing agent, a catalyst, and a surfactant, wherein the isocyanate-functional component and the isocyanate-reactive component are reacted at an isocyanate index of 90 to 120. Suitable isocyanate-reactive components (2) comprise: (a) from 20 to 100% by weight, based on 100% by weight of components (a) and (b), of a polyol blend having a hydroxyl number of from about 56 to about 250, an average functionality greater than about 2 and comprising: (i) one or more monofunctional polyethers having a hydroxyl number of less than or equal to 56, and containing less than 20% by weight of copolymerized oxyethylene, based on the total weight of (a)(i); (ii) one or more polyether polyols having a hydroxyl number of about 47 to about 300, a nominal functionality of 2, and containing from about 5 to about 45% by weight of copolymerized oxyethylene, based on the total weight of (a)(ii); and (iii) one or more polyether polyols having a hydroxyl number of from 47 to 300, a nominal functionality of greater than 2 to 8, and containing from 5 to 45% of copolymerized oxyethylene, based on the total weight of the polyether polyol (iii); wherein (a) the polyol blend comprises 20 to 50% by weight of (i) one or more monofunctional polyethers and the balance of (a) comprises components (ii) and (iii) in which from 10 to 90% by weight of the balance comprises component (ii) and from 90 to 10% by weight of the balance comprises component (iii); and, optionally (b) up to 80% by weight, based on 100% by weight of component (a) and component (b), of one or more polyether polyols having an average functionality of 2 to 8, a hydroxyl number of 20 to 300 and comprising at least 50% of copolymerized oxyethylene, based on 100% by weight of component (b).

In accordance with the present invention, the quantity, OH number and functionality of components (2)(a)(i), (2)(a)(ii) and (2)(a)(iii) are selected such that the resultant viscoelastic polyurethane foam has a ratio of the storage modulus at 15° C. to the storage modulus at 30° C. of less than or equal to 5 (or less than or equal to 4), and the resultant viscoelastic foam has a $T_g$ of less than 20° C. as measured by tan delta, over a density range of from about 1.0113/ft$^3$ to about 6.0113/ft$^3$, and at an isocyanate index of greater than 95 to about 110, with the proviso that when the Isocyanate Index is greater than or equal to about 105, the isocyanate-reactive component comprises at least about 3% (or at least about 5%) by weight of component (2)(b), based on 100% by weight of the isocyanate-reactive component.

The viscoelastic polyurethane foam will typically have a ratio of the storage modulus at 15° C. to the storage modulus 30° C. of less than or equal to 5, or less than or equal to 4, or less than or equal to 3. The ratio of the storage modulus at 15° C. to the storage modulus at 30° C. will also typically be greater than or equal to 1, or greater than or equal to 1.1, or greater than or equal to 1.2. Thus, the resultant viscoelastic foams will typically have a ratio of the storage modulus at 15° C. to the storage modulus at 30° C. ranging between any combination of these upper and lower values, inclusive, such as of less than or equal to 5 to greater than or equal to 1, or less than or equal to 4 to greater than or equal to 1.1, or less than or equal to 3 to greater than or equal to 1.2.

In addition, the resultant viscoelastic polyurethane foam also has a $T_g$ of less than 20° C., or of less than 18° C., or of less than 17° C., or of less than 16° C., or of less than 15° C., as measured by tan delta.

The viscoelastic polyurethane foams herein have a density in the range of from about 1.0 lb/ft$^3$ to about 6.0 lb/ft$^3$, preferably 2.0 lb/ft$^3$ to 5.0 lb/ft$^3$.

The isocyanate index used to prepare the viscoelastic polyurethane foams herein ranges from greater than 95 to about 110. The isocyanate index may be greater than 95, or greater than or equal to 96, or greater than or equal to 97. The isocyanate index may also be less than or equal to 110, or less than or equal to 109, or less than or equal to 107. The isocyanate index may range between any combination of upper and lower ranges, inclusive, such as from greater than 95 to less than or equal to 110, or from 96 to 109, or from 97 to 107.

In addition, in the process of preparing the viscoelastic polyurethane foam, the isocyanate-reactive component may additionally comprise at least one of: (c) one or more polyether polyols having an OH number of from about 10 to about 300, an average functionality of from about 2 to about 8, and containing from 0 to 45% by weight of copolymerized oxyethylene, based on 100% by weight of component (c); and/or (d) one or more filled polyols. Suitable polyether polyols (c) and filled polyols (d) for the process essentially correspond to those described previously with respect to the isocyanate-reactive compositions.

Suitable isocyanate-functional compounds comprise toluene diisocyanate (TDI, which is usually a mixture of 2,4- and 2,6-isomers), and various mixtures thereof.

In one embodiment, a foam modifier or foam processing aid is added to the formulation to enhance processing and help stabilize the viscoelastic foam against cold flow and/or dishing by providing dimensional stability against deformation and reduced settling of the viscoelastic foam. These processing aids or modifiers are typically chain extenders and/or cross-linking agents. In general, chain extenders and/or cross-linking agents are relatively small molecules which contain from 2 to 8 active hydrogen groups. The chain extenders and/or cross-linking agents may contain at least 2 active hydrogen groups, or at least 3 active hydrogen groups. Chain extenders and/or cross-linking agents may also contain less than or equal to 8 active hydrogen groups, or less than or equal to 6 active hydrogen groups. Suitable chain extenders and/or cross-linking agents may contain any number of active hydrogen groups in any combination ranging between these upper and lower values, inclusive, such as at least 2 to less than or equal to 8 active hydrogen groups, or at least 3 to less than or equal to 6 active hydrogen groups. Suitable chain extenders and/or cross-linking agents are added in amounts of from 0 to 4 parts per hundred parts of polyol. Some examples of suitable chain extenders and/or cross-linking agents that may be included in the reaction mixture of the invention include diethanolamine (DEOA), ethylene glycol (EG), diethylene glycol (DEG), propylene glycol (PG), dipropylene glycol (DPG), 1,4-butanediol (BDO), Arcol DP1022, Ortegol 204, Geolite 206 and Geolite 210. Some of these aids are described in, for example, U.S. Pat. Nos. 4,950,694 and 5,539,011, the disclosures of which are hereby incorporated by reference. Processing additives are particularly useful in accordance with the invention when TDI is used as the isocyanate component. These chain extenders and/or cross-linking agents may be present in amount of 0 parts or higher, or of 0.3 parts or higher, per hundred parts of polyol. The chain extenders and/or crosslinking agents may also be present in amounts of 4 parts or less, or of 2 parts or less, per hundred parts of polyol. The amount of chain extenders and/or crosslinking agent present may range between any combination of these upper and lower values, inclusive, such as from 0 to 4 parts, or from 0.3 to 2 parts per hundred parts polyol. It may also be beneficial at times to use a combination of these different foam modifiers or processing aids.

In addition, the foam modifiers or processing aids may have an OH number of at least 300, or of at least 600.

One definition of cold flow is the distortion, deformation or dimensional change which takes place in materials under continuous load at ambient temperature (source: CRC Press LLC, 1989). By "continuous load" it is meant the slabstock foam's own weight. A deformed appearance on the part of the slabstock foam is linked to an inhomogeneous distribution of the density throughout the entire foam and hence also some variance in the impression resistance. An example of cold flow is shown in FIG. 1B. Dishing is similar to cold flow but the sides and top of the foam block can pucker in as shown in FIG. 10. The use of foams modifiers helps to obtain foam that has less tendency to cold-flow which for the purposes of the present invention refers to good dimensional stability against deformation and preferably also reduced settling on the part of the foam, as shown in FIG. 1A, preferably paired with a uniform density distribution for the same impression resistance. The polyol blends described herein have also been found to result in foams with improved resistance to dishing and which exhibit less tendency to cold-flow.

Suitable blowing agents for the present invention include, for example chemical blowing agents, i.e. isocyanate reactive agents that generate blowing gases, such as for example water and formic acid and physical blowing agents such as acetone, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, and are described in U.S. Pat. No. 4,972,002, the disclosure of which is herein incorporated by reference.

The amount of blowing agent or blowing agent mixture used may range from 0.5 to 20% by weight, based on 100% by weight of the isocyanate-reactive component. In some instances, the amount of blowing agent present may be at least 0.5% or at least 0.75% by weight, based on 100% by weight of the isocyanate-reactive component. The amount of blowing agent present may also be about 20% or less, or about 10% by weight or less, based on 100% by weight of the isocyanate-reactive component. The blowing agent may be present in any amount ranging between any combination of these upper and lower above values, inclusive, such as from at least about 0.5% to about 20% or less, or from at least about 0.75% to about 10% by weight or less, based on 100% by weight of isocyanate-reactive component.

When water is the blowing agent, the amount of water typically present can range from at least about 0.5 to about 10%, based on 100% by weight of the isocyanate-reactive component. In some instances, the amount of blowing agent present may be at least 0.5% or at least 0.75% by weight, based on 100% by weight of the isocyanate-reactive component. The amount of water present as a blowing agent may also be about 10% or less, or about 7% by weight or less, based on 100% by weight of the isocyanate-reactive component. The blowing agent may be present in any amount ranging between any combination of these upper and lower values, inclusive, such as from at least about 0.5% to about 10% or less, or from at least about 0.75% to about 7% by weight or less, based on 100% by weight of isocyanate-reactive component. The addition of water can be effected in combination with the use of the other blowing agents described. In accordance with the present invention, water is the preferred blowing agent. Also, preferred is the use of water along with pressurized carbon dioxide that is dispersed in the polyol or resin blend and frothed by passing through a pressure let down device such as employed for example in the Henecke Novaflex, CarDio (Cannon Viking Limited) and Beamech ($CO_2$) machines, which are known by those skilled in the art.

The viscoelastic foam is produced in the presence of a surfactant, which helps to stabilize the viscoelastic foam until it cures. Suitable surfactants are those well known in the polyurethane industry. A wide variety of organosilicone surfactants are commercially available. Examples of suitable surfactants are Niax L-620 surfactant, a product of Momentive Performance Materials, and Tegostab B8244, a product of Evonik-Goldschmidt. Many other silicone surfactants known to those in the art may be substituted for these suitable silicones. The surfactant is typically used in an amount within the range of from at least about 0.1 to about 4 parts, per 100 parts of isocyanate-reactive mixture. Surfactants may be present in amounts ranging from at least about 0.1, or from at least about 0.2 parts per 100 parts of isocyanate-reactive mixture.

The surfactants may be also present in amounts ranging from about 4 parts or less, or from about 3 parts or less, per 100 parts of isocyanate-reactive mixture. The amount of surfactants may range between any combination of these upper and lower values, inclusive, such as from at least about 0.1 to about 4 parts, or from at least about 0.2 to about 3 parts, per 100 parts of isocyanate-reactive mixture.

At least one polyurethane catalyst is required to catalyze the reactions of the isocyanate-reactive components and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate is particularly preferred. Preferred organoamine catalysts are tertiary amines such as trimethylamine, triethylamine, triethylenediamine, bis(2,2'-dimethyl-amino)ethyl ether, N-ethylmorpholine, diethylenetriamine, and the like.

In another embodiment, suitable amine catalysts include non-emissive balanced amines which bind chemically into the polyurethane foam matrix and eliminate contributions to odor and VOC emissions or is of high enough molecular weight so as to not to contribute to VOC emissions. These are also referred to as non-fugitive amine catalysts. Examples of these catalysts include Dabco NE-300 and Dabco NE-500 from Evonik, N,N-bis(3-dimethyl-aminopropyl)-N-isopropanolamine (commercially available as Jeffcat ZR 50), N-(3-dimethylaminopropyl)-N,N-diisopropanolamine (commercially available as Jeffcat DPA), 1,4-diazabicyclo[2.2.2]octane-2-methanol (commercially available as RZETA) from TOSOH Corporation.

The polyurethane catalysts are typically used in an amount within the range of about 0.01 to about 3 parts per 100 parts of isocyanate-reactive mixture. The polyurethane catalysts may be present in amounts of from at least about 0.01, or from at least about 0.1 parts per 100 parts of isocyanate-reactive mixture. The polyurethane catalysts may be present in amounts of about 3 parts or less, or of about 2 parts per 100 parts of isocyanate-reactive mixture. The polyurethane catalysts may be present in any amount ranging between any combination of these upper and lower values, inclusive, such as from at least about 0.01 to about 3 parts, or from at least about 0.1 to about 2 parts, per 100 parts of isocyanate-reactive mixture.

Flame retardants, antioxidants, pigments, dyes, liquid and solid fillers, and many other commercial additives can also be included in the viscoelastic foams in conventional amounts.

The viscoelastic foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor.

Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The viscoelastic foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded viscoelastic foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The viscoelastic foam expands to fill the mold and produce a part with the shape and dimensions of the mold.

Although less preferred, a prepolymer approach to making the viscoelastic foams can also be used. In this approach, a significant portion of the isocyanate-reactive mixture is reacted with the polyisocyanate, and the resulting prepolymer is then reacted with the remaining components.

As used and referred to throughout the specification, air flow was measured in accordance with the NOPCO test procedure described by R. E. Jones and G. Fesman, "Journal of Cellular Plastics," January, 1965, Vol. No. 1, pp. 200-216, the disclosure of which is herein incorporated by reference, using a Amscor Model 1377 automated foam porosity tester. A 2 inch×2 inch×1 inch piece of foam was cut from near the center of the test specimens which itself was cut from the foam blocks after production. Air flow, expressed as standard cubic feet per minute (i.e. scfpm), was measured through the 1 inch thickness at a pressure differential of 0.5 inches of water less than atmospheric pressure. The air flow was in the direction of rise of the foam.

Other viscoelastic foam physical properties reported in the examples were measured per the standard procedures described in ASTM D3574-11.

Commercial production of viscoelastic foams involves mixing together a suitable polyisocyanate, a blowing agent, and an isocyanate-reactive component or mixture in the presence of a surfactant, one or more catalysts, and various other compounds which are known in the field of polyurethane chemistry to be suitable for preparing viscoelastic foams. Other isocyanate-reactive compounds to be used in addition to the above described polyol blends which comprise (a) the polyol blend and (b) the polyether polyol having an average functionality of 2 to 8, a hydroxyl number of 20 to 300 and comprising at least 50% by weight of copolymerized oxyethylene, based on the total weight of the polyether polyol, include other conventional polyols which are well known in the field of polyurethane chemistry. These include the relatively high molecular weight compounds such as, for example, polyether polyols, polyester polyols, polymer polyols, amine-terminated polyethers, polythioethers, polyacetals and polycarbonates, as well as various low molecular weight chain extenders and/or crosslinking agents both of which may contain hydroxyl groups and/or amine groups capable of reacting with the isocyanate groups of the isocyanate component.

In addition, the isocyanate-reactive component to be used in the viscoelastic polyurethane foams herein may additionally comprise at least one of (c) one or more polyether polyol having an OH number of from about 10 to about 300, an average functionality of from about 2 to about 8, and which contain from 0 to 45% by weight of copolymerized oxyethylene, based on 100% by weight of component (c); and/or (d) one or more filled polyols which are also commonly referred to as polymer polyols.

FIG. 1A is a cross-sectional view of a standard foam block prepared from a foam formulation which contained a processing aid or foam modifier. This foam exhibited less tendency to cold-flow. A reduced tendency to cold-flow refers to foams having good dimensional stability against deformation and reduced settling, paired with a uniform density distribution for the same impression resistance.

FIG. 1B is a cross-sectional view of a standard foam block prepared without a foam modifier, in which the foam block exhibited cold flow. As discussed herein, cold flow is the distortion, deformation or dimensional change which takes place in foams under continuous load at ambient temperature (source: CRC Press LLC, 1989). By "continuous load" it is meant the slabstock foam's own weight. A deformed appearance on the part of the slabstock foam is linked to an inhomogeneous distribution of the density throughout the entire foam and hence also some variance in the impression resistance. Foam blocks which exhibit cold flow are usually trapezoidal in shape. The foam of FIG. 1B is not illustrative of the present invention.

FIG. 10 is a cross-sectional view of a foam block prepared without a foam modifier in which the foam exhibited dishing. Dishing is similar to cold flow but the sides and top of the foam block can pucker in as shown in FIG. 10. As a result of dishing, the top surface and sides of the foam block become concave and are no longer trapezoidal in shape. The foam of FIG. 10 is not illustrative of the invention.

The glass transition temperatures ($T_g$) as measured by tan delta of various viscoelastic polyurethane foams was determined as described herein by Dynamic Mechanical Analysis. The tan delta is the ratio of the loss modulus to the storage modulus (a measure of the energy dissipation of a material) and, when measured over a range of temperatures, tan delta is generally an indicator of the viscoelasticity of the polyurethane foam at those temperatures. The DMA method described herein should be used to determine the tan delta response and the $T_g$ (peak tan delta value) of viscoelastic foams according to the claimed invention. Since viscoelastic polyurethane foam is made up of various internal hard and soft domains, the $T_g$ is not as definitive a number as with some other materials. As a result, there are various ways to measure and determine $T_g$ when evaluating DMA (Dynamic Mechanical Analysis) results. The results can be affected by the protocols used in running the DMA test. The DMA testing herein was performed using the following protocol:

Dynamic Mechanical Analysis (DMA) of foam samples was performed using a TA Instruments Q800 DMA with an 8 mm dual cantilever fixture. The sample dimensions were typically 12.7 mm×40 mm×3 mm. There is an equilibration period at −100° C. which allowed the foam samples and equipment to stabilize before the temperature ramp. The foam samples were evaluated from −100° C. to 100° C. using a 1° C./minute ramp rate. The samples were subjected to a 20 μm oscillating deflection at a frequency of 1 Hz.

Figure 2:
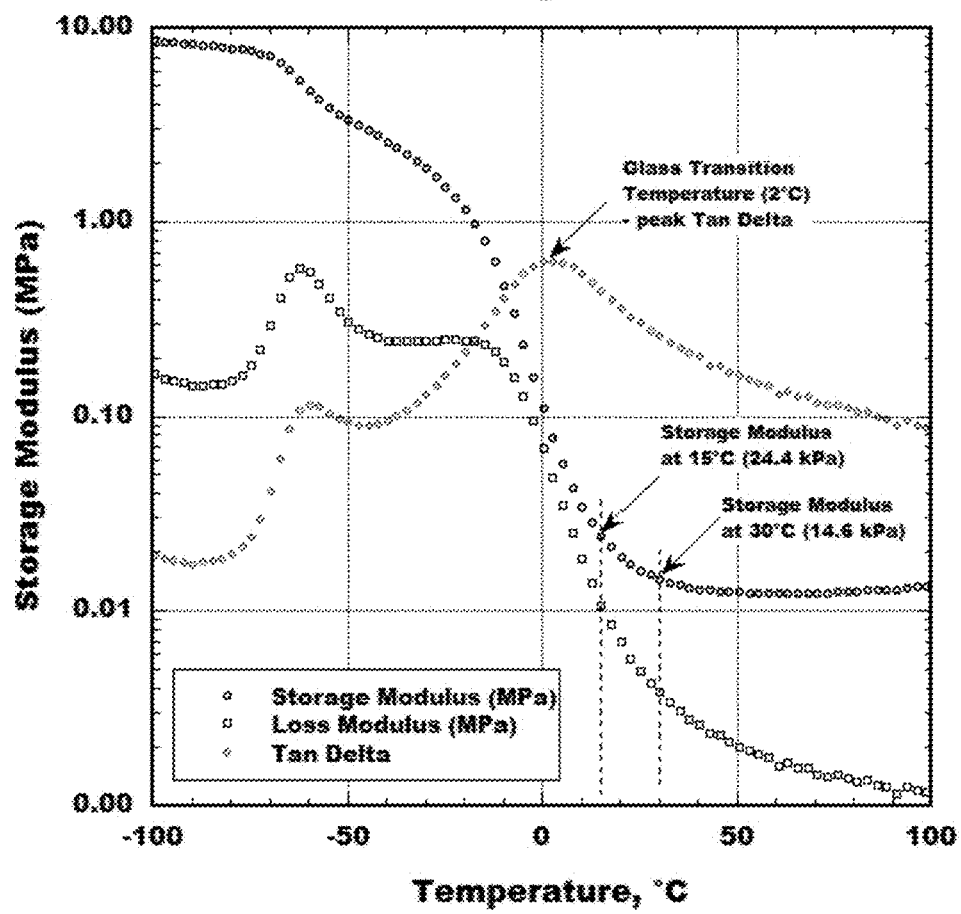
FIG. 2 is a Dynamic Mechanical Analysis (DMA) graph for a viscoelastic foam which illustrates storage modulus (MPa), loss modulus (MPa) and tan delta vs. temperature (° C.).

In FIG. 2, the Dynamic Mechanical Analysis (DMA) of a viscoelastic foam is shown. The DMA plot shows the Storage Modulus (MPa), the Loss Modulus (MPa), the tan delta curve, and the $T_g$ for the foam. The $T_g$ is the temperature at which the peak value in the tan delta curve occurs for the foam over the temperature range of −100° C. to 100° C. Evaluation of storage modulus in the 15° C. to 30° C. range, and particularly the ratio of storage modulus at 15° C. to 30° C., provides a good indication of the temperature sensitivity of the foam, with a higher ratio indicating a greater rate of property change. Consideration of only the $T_g$ (measured as the peak on the tan delta curve or any other single point measurement) of a foam does not accurately address the temperature sensitivity of a foam at its typical use temperature. Thus, to accurately evaluate the overall performance of a foam, it is recommended to consider both the $T_g$ and the ratio of storage modulus at 15° C. to 30° C.

In FIG. 2, the foam has a $T_g$ of 2° C. and the storage modulus ratio at 15° C. to 30° C. is 1.67. The storage modulus ratio is calculated by dividing the value of the storage modulus at 15° C. by the value of the storage modulus at 30° C., or 24.4 kPa/14.6 kPa=1.67.

In a first embodiment, the invention is directed to a process for preparing a viscoelastic polyurethane foam comprising reacting: (1) toluene diisocyanate, with (2) an isocyanate-reactive component comprising: (a) from 20 to 100% by weight, based on 100% by weight of components (2)(a) and (2)(b), of a polyol blend having a hydroxyl number of from 56 mg KOH/g polyol to less than 120 mg KOH/g polyol, an average functionality of greater than 2, and comprising: (i) a monofunctional polyether having a hydroxyl number of less than or equal to 56 mg KOH/g polyol, and containing less than or equal to 20% of copolymerized oxyethylene, based on the total weight of the monofunctional polyether; (ii) a polyether polyol having a hydroxyl number of from 47 mg KOH/g polyol to 300 mg KOH/g polyol, a nominal functionality of 2, and containing from 5 to 45% of copolymerized oxyethylene, based on the total weight of the polyether polyol (a)(ii); and (iii) a polyether polyol having a hydroxyl number of from 47 mg KOH/g polyol to 300 mg KOH/g polyol, a nominal functionality of greater than 2 to 8, and containing from 5 to 45% of copolymerized oxyethylene, based on the total weight of the polyether polyol (a)(iii); wherein (a) the polyol blend comprises 20 to 50% by weight of (i) the monofunctional polyether and the balance comprises components (ii) and (iii) in which from 10 to 90% by weight of the balance comprises component (ii) and from 90 to 10% by weight of the balance comprises component (iii); and, optionally, (b) up to 80% by weight, based on 100% by weight of components (2)(a) and (2)(b), of a polyether polyol having an average functionality of from 2 to 8, a hydroxyl number of from 20 mg KOH/g polyol to 300 mg KOH/g polyol and containing at least 50% of copolymerized oxyethylene, based on the total weight of the polyether polyol (2)(b); in the presence of (3) a blowing agent; (4) a catalyst; and (5) a surfactant; wherein the quantity, OH number and functionality of components (2)(a)(i), (2)(a)(ii) and (2)(a)(iii) are selected such that the resultant viscoelastic foam has a ratio of the storage modulus at 15° C. to the storage modulus at 30° C. of less than or equal to 4 to about 1, and wherein the resultant viscoelastic foam has a $T_g$ of less than 20° C. as measured by tan delta over a density range of from 1.0 lb/ft$^3$ to 6.0 lb/ft$^3$ at an NCO Index of greater than 95 to 110, with the proviso that when the NCO Index is greater than or equal to about 105, the isocyanate-reactive component comprises at least about 3% by weight of component (2)(b), based on 100% by weight of component (2).

In a second embodiment, the invention is directed to the process according to the first embodiment in which (2)(a) the polyol blend has a hydroxyl number of from 70 mg KOH/g polyol to less than 120 mg KOH/g polyol and an average functionality of at least 2.1.

In a third embodiment, the invention is directed to the process according to one of the first or second embodiments in which (2)(a) the polyol blend has a hydroxyl number of from 80 mg KOH/g polyol to less than about 118 mg KOH/g polyol.

In a fourth embodiment, the invention is directed to the process according to one of the first to third embodiments, in which (2)(a) the polyol blend has a hydroxyl number of from about 90 mg KOH/g polyol to about 110 mg KOH/g polyol.

In a fifth embodiment, the invention is directed to the process according to one of the first to fourth embodiments in which (2)(a)(i) the monofunctional polyether has a hydroxyl number of less than or equal to 28 mg KOH/g polyol and contains at least 2% to 15% or less of copolymerized oxyethylene, based on the total weight of the monofunctional polyether (2)(a)(i); (2)(a)(ii) the polyether polyol has a hydroxyl number of from 70 mg KOH/g polyol to 240 mg KOH/g polyol and contains from 10% to 40% by weight of copolymerized oxyethylene, based on the total weight of the polyether polyol (2)(a)(ii); and (2)(a)(iii) the polyether polyol has a hydroxyl number of from 70 mg KOH/g polyol to 240 mg KOH/g polyol, a nominal functionality of 3 to 6, and contains 10% to 40% by weight of copolymerized oxyethylene, based on the total weight of the polyether polyol (2)(a)(iii).

In a sixth embodiment, the invention is directed to the process according to one of the first to fifth embodiments in which (2) the isocyanate-reactive component additionally comprises at least one of: (c) a polyether polyol having an hydroxyl number of from 10 mg KOH/g polyol to 300 mg KOH/g polyol, an average functionality of from 2 to 8, and which contain from 0 to 45% by weight of copolymerized oxyethylene, based on 100% by weight of component (c), wherein polyether polyol (c) is different than polyether polyols (a)(ii) and (a)(iii); and/or (d) a filled polyol.

In a seventh embodiment, the invention is directed to the process according to one of the first to sixth embodiments in which the polyol blend (a) comprises 25 to 45% by weight of (i) the monofunctional polyether, and the balance comprises components (ii) and (iii) in which from 15 to 85% by weight of the balance comprises component (ii) and from 85% to 15% by weight of the balance comprises component (iii).

In an eighth embodiment, the invention is directed to the process according to one of the first to seventh embodiments in which the relative amounts of (a) and (b) are 85% to 99% by weight of (a) and 15% to 1% by weight of (b), based on 100% by weight of (2) the isocyanate-reactive component.

In a ninth embodiment, the invention is directed to the process according to one of the first to eighth embodiments in which (b) the polyether polyol has a hydroxyl number of 30 mg KOH/g polyol to 170 mg KOH/g polyol, an average functionality of 2.5 to 6, and contains 50% to 99% by weight of copolymerized oxyethylene, based on 100% by weight of component (b).

In a tenth embodiment, the invention is directed to the process according to one of the first to ninth embodiments in which (c) the polyether polyol has a hydroxyl number of at least 20 mg KOH/g polyol to 150 mg KOH/g and a functionality of at least 2.5 to 6; and (d) the filled polyol comprises a polymer polyol selected from the group consisting of (i) polymer polyols containing styrene-acrylonitrile solids, (ii) polyisocyanate polyaddition polyols, (iii) polyhydrazodicarbonamide polyols and (iv) mixtures thereof.

In an eleventh embodiment, the invention is directed to the process according to one of the first to tenth embodiments in which (a) the polyol blend comprises an in-situ formed polyol blend.

In a twelfth embodiment, the invention is directed to the process according to one of the first to eleventh embodiments in which (a) the in-situ formed polyol blend is prepared by: A) introducing into a reaction vessel a mixture comprising: (1) an initial starter ($S_i$) comprising a monofunctional compound having a hydroxyl number of less than 56 mg KOH/g polyol, and (2) a DMC (double metal cyanide) catalyst, B) feeding (1) an epoxide comprising propylene oxide and ethylene oxide in a weight ratio of from 100:0 to 20:80, into the reaction vessel; C) allowing the epoxide mixture and the initial starter ($S_i$) to react and continuing to polymerize by feeding the epoxide until the equivalent weight of the monofunctional compound is increased by at least 10% by weight and reaches a value between about 1,500 and about 6,000; D) continuously adding (1) a low molecular weight starter ($S_c$) having a nominal functionality of greater than 2 to 6, and an equivalent weight of 28 to 400 into the reaction vessel while continuing to feed epoxide; E) completing addition of the continuous starter ($S_c$); and F) allowing the mixture to continue polymerizing in the reaction vessel thereby forming (a) an in-situ formed polyol blend which has an overall hydroxyl number of from 56 mg KOH/g polyol to less than 120 mg KOH/g polyol, an average functionality of greater than 2, and which comprises (i) a monofunctional polyether having a hydroxyl number of less than or equal to 56 mg KOH/g polyol, and containing less than or equal to 20% by weight of copolymerized oxyethylene, based on 100% by weight of the monofunctional polyethers(a)(i); (ii) a polyether polyol having a hydroxyl number of 47 mg KOH/g polyol to 300 mg KOH/g polyol, a nominal functionality of 2 and containing from 5 to 45% by weight of copolymerized oxyethylene, based on the total weight of the polyether polyol (a)(ii); and (iii) a polyether polyol having a hydroxyl number of 47 mg KOH/g polyol to 300 mg KOH/g polyol, a nominal functionality of greater than 2 to 8, and containing from 5 to 45% by weight of copolymerized oxyethylene, based on the total weight of the polyether polyol (a)(iii); wherein (a) the polyol blend comprises 20 to 50% by weight of (i) the monofunctional polyether and the balance of (a) comprises components (ii) and (iii) in which from 10 to 90% by weight of the balance comprises component (ii) and from 90 to 10% by weight of the balance comprises component (iii); and, optionally, (II) combining the in-situ formed polyol blend (a) with (b) up to 80% by weight, based on 100% by weight of components (a) and (b), of a polyether polyol having an average functionality of 2 to 8, a hydroxyl number of 20 mg KOH/g polyol to 300 mg KOH/g polyol and containing at least 50% of copolymerized oxyethylene, based on the total by weight of the polyether polyol(b).

In a thirteenth embodiment, the invention is directed to the process according to one of the first to twelfth embodiments in which the resultant in-situ formed polyol blend is additionally combined with at least one of: (c) one or more polyether polyols having an hydroxyl number of from about 10 mg KOH/g polyol to about 300 mg KOH/g polyol, an average functionality of from about 2 to about 8, and which contain from 0 to 45% by weight of copolymerized oxyethylene, based on 100% by weight of component (c); and (d) one or more filled polyols.

In a fourteenth embodiment, the invention is directed to the process according to one of first to thirteenth embodiments in which A)(1) the initial starter ($S_i$) is prepared from a starter comprising one or more $C_{12}$, $C_{13}$, $C_{14}$ and/or $C_{15}$ long chain alcohols.

In a fifteenth embodiment, the invention is directed to the process according to one of the first to the fourteenth embodiments in which the low molecular weight starter ($S_c$) comprises glycerin, propylene glycol, ethylene glycol, sucrose, sorbitol, or mixtures thereof.

In a sixteenth embodiment, the invention is directed to the process according to one of the first to the fifteenth embodiments in which the resultant polyol composition in F) has an overall hydroxyl number of 70 mg KOH/g polyol to less than 120 mg KOH/g polyol and an average functionality of at least 2.1.

In a seventeenth embodiment, the invention is directed to the process according to one of the first to the sixteenth embodiments in which the resultant polyol component in F)

has an overall hydroxyl number of about 80 mg KOH/g polyol to less than about 118 mg KOH/g polyol.

In an eighteenth embodiment, the invention is directed to the process according to one of the first through the seventeenth embodiments in which the resultant polyol component in F) has an overall hydroxyl number of about 90 mg KOH/g polyol to about 110 mg KOH/g polyol.

In a nineteenth embodiment, the invention is directed to the process according to one of the first to the eighteenth embodiments in which the resultant viscoelastic polyurethane foam has a $T_g$ of less than 18° C. as measured by tan delta.

In a twentieth embodiment, the invention is directed to the process according to one of the first to the nineteenth embodiments in which the resultant viscoelastic polyurethane foam has a ratio of the storage modulus at 15° C. to the storage modulus at 30° C. of less than or equal to 3 to 1.1.

In a twenty-first embodiment, the invention is directed to the process according to one of the first to twentieth embodiments in which the resultant viscoelastic polyurethane foam has a $T_g$ of less than 17° C. as measured by tan delta.

In a twenty-second embodiment, the invention is directed to the process according to one of the first to the twenty-first embodiments in which the resultant viscoelastic polyurethane foam has a ratio of the storage modulus 15° C. to the storage modulus at 30° C. of less than or equal to 3 to 1.2.

In a twenty-third embodiment, the invention is directed to the process according to one of the first to the twenty-second embodiments in which (4) the catalyst comprises a non-fugitive amine catalyst.

In a twenty-fourth embodiment, the invention is directed to the process according to one of the first to the twenty-third embodiments in which (3) the blowing agent comprises water.

In a twenty-fifth embodiment, the invention is directed to the process according to one of the first to the twenty-fourth embodiments wherein when the NCO Index of the overall system is greater than or equal to about 105, the isocyanate-reactive component comprises at least about 5% by weight of component (b), based on 100% by weight of component (2).

In a twenty-sixth embodiment, the invention is directed to the process according to one of the first to the twenty-fifth embodiments wherein the isocyanate index ranges from about 96 to about 109.

In a twenty-seventh embodiment, the invention is directed to the process according one of the first to the twenty-sixth embodiments wherein the isocyanate index ranges from about 97 to about 107.

In a twenty-eighth embodiment, the invention is directed to the process according to one of the first to the twenty-seventh embodiments additionally comprising a foam modifier or foam processing aid.

In a twenty-ninth embodiment, the invention is directed to a viscoelastic polyurethane foam comprising reacting: (1) toluene diisocyanate, with (2) an isocyanate-reactive component comprising: (a) from 20 to 100% by weight, based on 100% by weight of components (2)(a) and (2)(b), of a polyol blend having a hydroxyl number of from 56 mg KOH/g polyol to less than 120 mg KOH/g polyol, an average functionality of greater than 2, and comprising: (i) a monofunctional polyether having a hydroxyl number of less than or equal to 56 mg KOH/g polyol, and containing less than or equal to 20% of copolymerized oxyethylene, based on the total weight of the monofunctional polyether; (ii) a polyether polyol having a hydroxyl number of from 47 mg KOH/g polyol to 300 mg KOH/g polyol, a nominal functionality of 2, and containing from 5 to 45% of copolymerized oxyethylene, based on the total weight of the polyether polyol (a)(ii); and (iii) a polyether polyol having a hydroxyl number of from 47 mg KOH/g polyol to 300 mg KOH/g polyol, a nominal functionality of greater than 2 to 8, and containing from 5 to 45% of copolymerized oxyethylene, based on the total weight of the polyether polyol (a)(iii); wherein (a) the polyol blend comprises 20 to 50% by weight of (i) the monofunctional polyether and the balance comprises components (ii) and (iii) in which from 10 to 90% by weight of the balance comprises component (ii) and from 90 to 10% by weight of the balance comprises component (iii); and, optionally, (b) up to 80% by weight, based on 100% by weight of components (2)(a) and (2)(b), of a polyether polyol having an average functionality of from 2 to 8, a hydroxyl number of from 20 mg KOH/g polyol to 300 mg KOH/g polyol and containing at least 50% of copolymerized oxyethylene, based on the total weight of the polyether polyol (2)(b); in the presence of (3) a blowing agent; (4) a catalyst; and (5) a surfactant; wherein the quantity, OH number and functionality of components (2)(a)(i), (2)(a)(ii) and (2)(a)(iii) are selected such that the resultant viscoelastic foam has a ratio of the storage modulus at 15° C. to the storage modulus at 30° C. of less than or equal to 4 to about 1, and wherein the resultant viscoelastic foam has a $T_g$ of less than 20° C. as measured by tan delta over a density range of from 1.0 lb/ft$^3$ to 6.0 lb/ft$^3$ at an NCO Index of greater than 95 to 110, with the proviso that when the NCO Index is greater than or equal to about 105, the isocyanate-reactive component comprises at least about 3% by weight of component (2)(b).

In a thirtieth embodiment, the invention is directed to the viscoelastic polyurethane foam according to the twenty-ninth embodiment in which (2)(a) the polyol blend has a hydroxyl number of from 70 mg KOH/g polyol to less than 120 mg KOH/g polyol and an average functionality of at least 2.1.

In a thirty-first embodiment, the invention is directed to the viscoelastic foam according to one of the twenty-ninth to the thirtieth embodiments in which (2)(a) the polyol blend has a hydroxyl number of from 80 mg KOH/g polyol to less than about 118 mg KOH/g polyol.

In a thirty-second embodiment, the invention is directed to the viscoelastic foam according to one of the twenty-ninth to the thirty-first embodiments in which (2)(a) the polyol blend has a hydroxyl number of from 90 mg KOH/g polyol to about 110 mg KOH/g polyol.

In a thirty-third embodiment, the invention is directed to the viscoelastic polyurethane foam according to one of the twenty-ninth to the thirty-second embodiments in which (2)(a)(i) the monofunctional polyether has a hydroxyl number of less than or equal to 28 mg KOH/g polyol and contains at least 2% to 15% or less of copolymerized oxyethylene, based on the total weight of the monofunctional polyether (2)(a)(i); (2)(a)(ii) the polyether polyol has a hydroxyl number of from 70 mg KOH/g polyol to 240 mg KOH/g polyol and contains from 10% to 40% by weight of copolymerized oxyethylene, based on the total weight of the polyether polyol (2)(a)(ii); and (2)(a)(iii) the polyether polyol has a hydroxyl number of from 70 mg KOH/g polyol to 240 mg KOH/g polyol, a nominal functionality of 3 to 6, and contains 10% to 40% by weight of copolymerized oxyethylene, based on the total weight of the polyether polyol (2)(a)(iii).

In a thirty-fourth embodiment, the invention is directed to the viscoelastic polyurethane foam according to one of the twenty-ninth to the thirty-third embodiments in which (2) the isocyanate-reactive component additionally comprises at least one of: (c) a polyether polyol having an hydroxyl number of from 10 mg KOH/g polyol to 300 mg KOH/g polyol, an average functionality of from 2 to 8, and which contain from 0 to 45% by weight of copolymerized oxyethylene, based on 100% by weight of component (c), wherein polyether polyol (c) is different than polyether polyols (a)(ii) and (a)(iii); and/or (d) a filled polyol.

In a thirty-fifth embodiment, the invention is directed to the viscoelastic polyurethane foam according to one of the twenty-ninth to the thirty-fourth embodiments in which the polyol blend (a) comprises 25 to 45% by weight of (i) the monofunctional polyether, and the balance comprises components (ii) and (iii) in which from 15 to 85% by weight of the balance comprises component (ii) and from 85% to 15% by weight of the balance comprises component (iii).

In a thirty-sixth embodiment, the invention is directed to the viscoelastic polyurethane foam according to one of the twenty-ninth to the thirty-fifth embodiments in which the relative amounts of (a) and (b) are 85% to 99% by weight of (a) and 15% to 1% by weight of (b), based on 100% by weight of (2) the isocyanate-reactive component.

In a thirty-seventh embodiment, the invention is directed to the viscoelastic polyurethane foam according to one of the twenty-ninth to the thirty-sixth embodiments in which (b) the polyether polyol has a hydroxyl number of 30 mg KOH/g polyol to 170 mg KOH/g polyol, an average functionality of 2.5 to 6, and contains 50% to 99% by weight of copolymerized oxyethylene, based on 100% by weight of component (b).

In a thirty-eighth embodiment, the invention is directed to the viscoelastic polyurethane foam according to one of the twenty-ninth to the thirty-seventh embodiments in which (c) the polyether polyol has a hydroxyl number of at least 20 mg KOH/g polyol to 150 mg KOH/g and a functionality of at least 2.5 to 6; and (d) the filled polyol comprises a polymer polyol selected from the group consisting of (i) polymer polyols containing styrene-acrylonitrile solids, (ii) polyisocyanate polyaddition polyols, (iii) polyhydrazodicarbonamide polyols and (iv) mixtures thereof.

In a thirty-ninth embodiment, the invention is directed to the viscoelastic polyurethane foam according to one of the twenty-ninth to the thirty-eighth embodiments in which (a) the polyol blend comprises an in-situ formed polyol blend.

In a fortieth embodiment, the invention is directed to the viscoelastic polyurethane foam according to one of the twenty-ninth to the thirty-ninth embodiments in which (a) the in-situ formed polyol blend is prepared by: A) introducing into a reaction vessel a mixture comprising: (1) an initial starter ($S_i$) comprising a monofunctional compound having a hydroxyl number of less than 56 mg KOH/g polyol, and (2) a DMC (double metal cyanide) catalyst, B) feeding (1) an epoxide comprising propylene oxide and ethylene oxide in a weight ratio of from 100:0 to 20:80, into the reaction vessel; C) allowing the epoxide mixture and the initial starter ($S_i$) to react and continue polymerizing by feeding the epoxide until the equivalent weight of the monofunctional compound is increased by at least 10% by weight and reaches a value between about 1,500 and about 6,000; D) continuously adding (1) a low molecular weight starter ($S_c$) having a nominal functionality of greater than 2 to 6, and an equivalent weight of 28 to 400 into the reaction vessel while continuing to feed epoxide; E) completing addition of the continuous starter ($S_c$); and F) allowing the mixture to continue polymerizing in the reaction vessel thereby forming (a) an in-situ formed polyol blend which has an overall hydroxyl number of from 56 mg KOH/g polyol to less than 120 mg KOH/g polyol, an average functionality of greater than 2, and which comprises (i) a monofunctional polyether having a hydroxyl number of less than or equal to 56 mg KOH/g polyol, and containing less than or equal to 20% by weight of copolymerized oxyethylene, based on 100% by weight of the monofunctional polyethers(a)(i); (ii) a polyether polyol having a hydroxyl number of 47 mg KOH/g polyol to 300 mg KOH/g polyol, a nominal functionality of 2 and containing from 5 to 45% by weight of copolymerized oxyethylene, based on the total weight of the polyether polyol (a)(ii); and (iii) a polyether polyol having a hydroxyl number of 47 mg KOH/g polyol to 300 mg KOH/g polyol, a nominal functionality of greater than 2 to 8, and containing from 5 to 45% by weight of copolymerized oxyethylene, based on the total weight of the polyether polyol (a)(iii); wherein (a) the polyol blend comprises 20 to 50% by weight of (i) the monofunctional polyether and the balance of (a) comprises components (ii) and (iii) in which from 10 to 90% by weight of the balance comprises component (ii) and from 90 to 10% by weight of the balance comprises component (iii); and, optionally, (II) combining the in-situ formed polyol blend (a) with (b) up to 80% by weight, based on 100% by weight of components (a) and (b), of a polyether polyol having an average functionality of 2 to 8, a hydroxyl number of 20 mg KOH/g polyol to 300 mg KOH/g polyol and containing at least 50% of copolymerized oxyethylene, based on the total by weight of the polyether polyol(b).

In a forty-first embodiment, the invention is directed to the viscoelastic polyurethane foam according to one of the twenty-ninth to the fortieth embodiments in which the resultant in-situ formed polyol blend is additionally combined with at least one of: (c) one or more polyether polyols having an hydroxyl number of from about 10 mg KOH/g polyol to about 300 mg KOH/g polyol, an average functionality of from about 2 to about 8, and which contain from 0 to 45% by weight of copolymerized oxyethylene, based on 100% by weight of component (c); and (d) one or more filled polyols.

In a forty-second embodiment, the invention is directed to the viscoelastic polyurethane foam according to one of the twenty-ninth to the forty-first embodiments in which A)(1) the initial starter ($S_i$) is prepared from a starter comprising one or more $C_{12}$, $C_{13}$, $C_{14}$ and/or $C_{15}$ long chain alcohols.

In a forty-third embodiment, the invention is directed to the viscoelastic polyurethane foam according to one of the twenty-ninth to the forty-second embodiments in which the low molecular weight starter (Sc) comprises glycerin, propylene glycol, ethylene glycol, sucrose, sorbitol, or mixtures thereof.

In a forty-fourth embodiment, the invention is directed to the viscoelastic polyurethane foam according to one of the twenty-ninth to the forty-third embodiments in which the resultant polyol composition in F) has an overall hydroxyl number of 70 mg KOH/g polyol to less than 120 mg KOH/g polyol and an average functionality of at least 2.1.

In a forty-fifth embodiment, the invention is directed to the viscoelastic polyurethane foam according to one of the twenty-ninth to the forty-fourth embodiments in which the resultant polyol composition in F) has an overall hydroxyl number of 80 mg KOH/g polyol to less than 118 mg KOH/g polyol.

In a forty-sixth embodiment, the invention is directed to the viscoelastic polyurethane foam according to one of the twenty-ninth to the forty-fifth embodiments in which the resultant polyol composition in F) has an overall hydroxyl number of 90 mg KOH/g polyol to less than 110 mg KOH/g polyol.

In a forty-seventh embodiment, the invention is directed to the viscoelastic polyurethane foam according to one of the twenty-ninth to the forty-sixth embodiments in which the resultant viscoelastic polyurethane foam has a $T_g$ of less than 18° C. as measured by tan delta.

In a forty-eighth embodiments, the invention is directed to the viscoelastic polyurethane foam according to one of the twenty-ninth to the forty-seventh embodiments in which the resultant viscoelastic polyurethane foam has a ratio of the storage modulus at 15° C. to 30° C. of less than or equal to 3 to 1.1.

In a forty-ninth embodiment, the invention is directed to the viscoelastic polyurethane foam according to one of the twenty-ninth to the forty-eighth embodiments in which the resultant viscoelastic polyurethane foam has a $T_g$ of less than 17° C. as measured by tan delta.

In a fiftieth embodiment, the invention is directed to the viscoelastic polyurethane foam according to one of the twenty-ninth to the forty-ninth embodiments in which the resultant viscoelastic polyurethane foam has a ratio of the storage modulus at 15° C. to 30° C. of less than or equal to 3 to 1.2.

In a fifty-first embodiment, the invention is directed to the viscoelastic polyurethane foam according to one of the twenty-ninth to the fiftieth embodiments in which (4) the catalyst comprises a non-fugitive amine catalyst.

In a fifty-second embodiment, the invention is directed to the viscoelastic polyurethane foam according to one of the twenty-ninth to the fifty-first embodiments in which (3) the blowing agent comprises water.

In a fifty-third embodiment, the invention is directed to the viscoelastic polyurethane foam according to one of the twenty-ninth to the fifty-second embodiments wherein when the NCO Index of the overall system is greater than or equal to about 105, the isocyanate-reactive component comprises at least about 5% by weight of component (b), based on 100% by weight of component (2).

In a fifty-fourth embodiment, the invention is directed to the viscoelastic polyurethane foam according to one of the twenty-ninth to the fifty-third embodiments in which the isocyanate index ranges from 96 to 109.

In a fifty-fifth embodiment, the invention is directed to the viscoelastic polyurethane foam according to one of the twenty-ninth to the fifty-fourth embodiments in which the isocyanate index ranges from 97 to 107.

In a fifty-sixth embodiment, the invention is directed to the viscoelastic polyurethane foam according to one of the twenty-ninth to the fifty-fifth embodiments additionally comprising a foam modifier or foam processing aid.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Test Methods:

Hydroxyl Numbers: The hydroxyl numbers were determined in accordance with ASTM D-4274-11, and are reported in mg KOH/g polyol.

PMPO Solids Content: The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene (S) to acrylonitrile (AN) in the total polymer. One skilled in the art will recognize that this is an analytical confirmation of the main mechanism for controlling the S/AN ratio, which is the wt % of monomers in the total reactor feed.

Other foam physical properties reported herein were measured per the standard procedures described in ASTM D3574-11.

As used herein, "pphp" represents parts per hundred parts.

The following materials were used in the working examples:

Polyol A: An in-situ prepared multifunctional polyol prepared by alkoxylating a monol, diol, and triol with a DMC catalyst following the procedure described in U.S. Pat. No. 6,491,846. The starter comprises a 1600 MW (35 OH #) monol made from the propoxylation of Neodol 25 and is alkoxylated with a mixture of propylene oxide and ethylene oxide in a weight ratio of 82/18 to a hydroxyl number of about 17.8 mg KOH/g polyol. At this point, a mixture of glycerin and propylene glycol in a 62.3 to 37.7 wt % ratio is continuously added along with mixture of propylene oxide and ethylene oxide in a weight ratio of 82/18 until a hydroxyl number of about 125 mg KOH/g polyol is reached. At this point, the propylene glycol and glycerin feeds are stopped and propylene oxide and ethylene oxide are continuously added in a weight ratio of 55/45 until a nominal hydroxyl number of 100 mg KOH/g polyol is reached. The product had an overall functionality of about 2.4 and a nominal hydroxyl number of about 100 mg KOH/g polyol.

Polyol B: A glycerin started poly(oxypropyleneoxyethylene) polyol having a hydroxyl number of about 37 mg KOH/g polyol, and containing about 73% of copolymerized oxyethylene Polyol C: A glycerin started poly(oxypropyleneoxyethylene) polyol having a hydroxyl number of about 56 mg KOH/g polyol, and containing about 7% of copolymerized oxyethylene Polyol D: A polymer polyol containing about 49% solids, and prepared by in-situ polymerization of styrene and acrylonitrile in a glycerin started poly(oxypropyleneoxyethylene) polyol having a hydroxyl number of about 52 mg KOH/g polyol, and containing about 13% of oxyethylene Polyol E: An in-situ prepared multifunctional polyol prepared by alkoxylating a monol, diol, and triol with a DMC catalyst following the procedure described in U.S. Pat. No. 6,491,846. The starter comprises a 1600 MW (35 OH #) monol made from the propoxylation of Neodol 25 and is alkoxylated with a mixture of propylene oxide and ethylene oxide in a weight ratio of 82/18 to a hydroxyl number of about 17.8 mg KOH/g polyol. At this point, a mixture of glycerin and propylene glycol in a 62.3 to 37.7 wt % ratio is continuously added along with mixture of propylene oxide and ethylene oxide in a weight ratio of 82/18 until a hydroxyl number of about 150 mg KOH/g polyol is reached. At this point, the propylene glycol and glycerin feeds are stopped and propylene oxide and ethylene oxide are continuously added in a weight ratio of 55/45 until a hydroxyl number of 120 mg KOH/g polyol is reached. The product had an overall functionality of about 2.4 and an overall hydroxyl number of about 120 mg KOH/g polyol.

Foam Modifier A: A foam modifier having a hydroxyl number of about 1240 mg KOH/g polyol, commercially available from Momentive Performance Materials as Arcol DP-1022

Foam Modifier B: A delayed action crosslinking agent available from Evonik Industries as Ortegol 204

Surfactant A: A silicone surfactant commercially available from Momentive Performance Materials as Niax L-618

Catayst A: An amine catalyst, commercially available from Momentive Performance Materials as Niax A-33

Catalyst B: An amine catalyst, commercially available from Momentive Performance Materials as Niax A-1

Catalyst C: Tin octoate, commercially available from Evonik as Dabco T-9

Catalyst D: N-[2-[2-(dimethylamino)ethoxy]ethyl]-N-methyl-1,3-propanediamine, commercially available from Evonik as Dabco NE300

Catalyst E: triethylene diamine (33% by wt.) in dipropylene glycol (67% by wt.), commercially available from Evonik as Dabco 33LV Catalyst F: a reactive amine catalyst polyol blend, commercially available from Huntsman as Jeffcat LE-225

Catalyst G: a reactive amine catalyst, commercially available from Huntsman as Jeffcat LE-220

MeCl: methylene chloride

Isocyanate A: toluene diisocyanate having 80% of 2,4-isomer and 20% of 2.6-isomer The free-rise bench scale foams of Tables 2A, 2B and 2C were prepared using the following procedure. The polyols, water, silicone surfactants, amine catalysts, and any other non-isocyanate additives were added to a cylindrical container fitted with baffles. The contents were mixed at 2400 rpm for 60 seconds with an agitator having two turbine impellers. Tin Catalyst C, if employed, was added at this time. The mixture was then degassed for 15 seconds. After degassing, the contents were mixed at 2400 rpm for 15 seconds, during which period the isocyanate was added when about 10 seconds of mixing time remained. The mixture was then poured into a 14×14×6-inch cardboard box, where it rose freely until the reaction was complete. A batch size sufficient to give a bun at least about 6 inches high was employed. The freshly prepared bun was cured for 20 minutes in an oven at 120° C. and then allowed to cure at ambient conditions for a minimum of 1 day. Observations made during foaming and curing are set forth in the Tables. The buns were then trimmed to 12×12×4 inches and were roller crushed 3 times to a minimum thickness of about 0.5 inches. These samples were then conditioned for at least 16 hours at standard temperature (~23° C.) and humidity (~50%) before being tested.

The discontinuous free-rise box machine foam was prepared using the following procedure. This procedure was used to prepare the foam of Example 17. The polyols, water, silicone surfactants, amine catalysts, and any other non-isocyanate additives were added to a cylindrical container. The contents were mixed at 2400 rpm for 60 seconds with an agitator having one turbine impeller. The mixture was then degassed for 15 seconds. Tin Catalyst C was added at this time. After degassing, the contents were mixed at 2400 rpm for 15 seconds, during which period the isocyanate was added when about 7 seconds of mixing time remained. The Cannon-Viking box foam machine was used for these foams. All raw materials were added through a metering device, to a mix chamber (with maximum capacity of 120 kg) before being poured into a large open mold (approximately 200 cm by 200 cm by 150 cm height) and allowed to cure at ambient temperature for a minimum of 1 day. Observations made during foaming and curing are set forth in the Tables. The buns were then trimmed to top, middle and bottom (15 inches by 15 inches by 4 inches) foam sections and were roller crushed 3 times to a minimum thickness of about 0.5 inches. These samples were then conditioned for at least 16 hours at standard temperature (i.e. about 23° C.) and humidity (i.e. about 50%) before being tested.

The free-rise continuous MiniMax machine foams were produced using an one-third scale Maxfoam machine with Novaflex $CO_2$ capabilities. This procedure was used to prepare the foams of Examples 18 and 19. The Maxfoam machine offers the ability to add four individual polyol streams, two individual isocyanate streams, and fourteen individual additive streams, and to control the temperature of each individual polyol and isocyanate stream. In addition, computer control of the Maxfoam machine allows systems and foam grades to be changed throughout foam pour. Foam blocks ranged in size up to about 122 cm×122 cm×3048 cm in length can be prepared. Each foam grade was typically cut in about 10 ft. bun sections. The buns were then trimmed to top, middle and bottom 15×15×4 inches foam sections and were roller crushed 3 times to a minimum thickness of about 0.5 inches. These samples were then conditioned according to ASTM D3574-11 standard.

TABLE 1A

TDI FOAM FORMULATIONS:

| Example | | 1 | 2 | 3 | 4 | 5 |
|---|---|---|---|---|---|---|
| Chemical | OH # | pphp | pphp | pphp | pphp | pphp |
| Polyol A | 100 | 100.00 | 100.00 | 100.00 | 100.00 | 100.00 |
| Polyol B | 37 | 0 | 0 | 0 | 0 | 0 |
| Surfactant A | | 0.50 | 1.00 | 1.00 | 0.50 | 0.50 |
| Water (distilled) | 6228 | 1.25 | 2.30 | 2.30 | 1.63 | 1.05 |
| Catalyst A | 251 | 0.60 | 0.50 | 0.50 | 0.40 | 0.60 |
| Catalyst B | 560 | 0.03 | 0 | 0 | 0.07 | 0.07 |
| Catalyst C | | 0.03 | 0.05 | 0.05 | 0.05 | 0.03 |
| MeCl | | | 8.25 | 8.25 | | |
| Isocyanate Side | F NCO* | | | | | |
| Isocyanate A | 48.3 | 27.26 | 39.37 | 36.34 | 30.08 | 24.87 |
| NCO Index | | 98.00 | 104.00 | 96.00 | 96.00 | 96.00 |

*F NCO represents the NCO group content of the isocyanate component

TABLE 1B

TDI FOAM FORMULATIONS:

| Example | | 6 | 7 | 8 | 9 | 10 |
|---|---|---|---|---|---|---|
| Chemical | OH # | pphp | pphp | pphp | pphp | pphp |
| Polyol A | 100 | 100.00 | 100.00 | 100.00 | 100.00 | 100.00 |
| Surfactant A | | 1.60 | 1.60 | 1.60 | 1.60 | 1.60 |
| Water (distilled) | 6228 | 2.18 | 2.18 | 2.18 | 2.18 | 2.18 |
| Catalyst A | 251 | 0.40 | 0.40 | 0.40 | 0.40 | 0.40 |
| Catalyst B | 560 | 0.15 | 0.15 | 0.15 | 0.15 | 0.15 |
| Catalyst C | | 0.11 | 0.11 | 0.11 | 0.11 | 0.11 |
| Isocyanate Side | F NCO* | | | | | |
| Isocyanate A | 48.3 | 35.16 | 36.26 | 37.36 | 38.45 | 39.55 |
| NCO Index | | 96.00 | 99.00 | 102.00 | 105.00 | 108.00 |

*F NCO represents the NCO group content of the isocyanate component

TABLE 1C

TDI FOAM FORMULATIONS:

| Example | | 11 | 12 | 13 | 14 | 15 | 16 |
|---|---|---|---|---|---|---|---|
| Chemical | OH # | pphp | pphp | pphp | pphp | pphp | pphp |
| Polyol A | 100 | 100.00 | 93.00 | 93.00 | 93.00 | 100.00 | 0 |
| Polyol B | 37 | 0 | 7.00 | 7.00 | 7.00 | 0 | 0 |
| Polyol E | 120 | 0 | 0 | 0 | 0 | 0 | 100.00 |
| Surfactant A | | 1.60 | 1.60 | 1.60 | 1.60 | 0.50 | 0.50 |
| Water (distilled) | 6228 | 2.18 | 2.18 | 2.18 | 2.18 | 0.95 | 1.25 |
| Catalyst A | 251 | 0.40 | 0.40 | 0.40 | 0.40 | 0.60 | 0.60 |
| Catalyst B | 560 | 0.15 | 0.15 | 0.15 | 0.15 | 0.07 | 0.03 |
| Catalyst C | | 0.11 | 0.11 | 0.11 | 0.11 | 0.03 | 0.03 |
| Isocyanate Side | F NCO* | | | | | | |
| Isocyanate A | 48.3 | 37.72 | 37.76 | 38.84 | 39.56 | 23.94 | 30.58 |
| NCO Index | | 103.00 | 105.00 | 108.00 | 110.00 | 96.00 | 98.00 |

*F NCO represents the NCO group content of the isocyanate component

TABLE 2A

TDI FOAM-PHYSICAL PROPERTIES

| Example | units | 1 | 2 | 3 | 4 | 5 |
|---|---|---|---|---|---|---|
| Actual Density | kg/m³ (lb/ft³) | 62.95 (3.93) | 25.31 (1.58) | 27.07 (1.69) | 49.82 (3.11) | 72.72 (4.54) |
| Airflow | m³/min (ft³/min) | 0.066 (2.32) | 0.112 (3.98) | 0.147 (5.21) | 0.076 (2.70) | 0.064 (2.30) |
| IFD 25% | N (lbf) | 63.03 (14.17) | 29.71 (6.68) | 27.53 (6.19) | 51.96 (11.68) | 56.58 (12.72) |
| IFD 65% | N (lbf) | 136.69 (30.73) | 59.20 (13.31) | 56.18 (12.63) | 110.18 (24.77) | 130.82 (29.41) |
| IFD 25% Return | N (lbf) | 54.80 (12.32) | 21.17 (4.76) | 21.00 (4.72) | 43.37 (9.75) | 50.09 (11.26) |
| Return Val. 25% | % | 86.97 | 71.27 | 76.25 | 83.48 | 88.52 |

TABLE 2A-continued

TDI FOAM-PHYSICAL PROPERTIES

| Example | units | 1 | 2 | 3 | 4 | 5 |
|---|---|---|---|---|---|---|
| S.F. 65%/25% | NA | 2.17 | 1.99 | 2.04 | 2.12 | 2.31 |
| Tensile Strength | kPa (psi) | 39.44 (5.72) | 40.47 (5.87) | 33.30 (4.83) | 41.16 (5.97) | 34.68 (5.03) |
| Elongation | % | 152.1 | 154.40 | 153.40 | 144.10 | 138.10 |
| Tear Strength (20'/min-STDSP1) | N/m (pli) | 129.59 (0.74) | 162.86 (0.93) | 143.60 (0.82) | 159.36 (0.91) | 127.84 (0.73) |
| 90% Comp Set | % | 4.37 | 10.80 | 14.27 | 9.35 | 26.17 |
| Resilience (Ball Rebound) | % | 12.40 | 9.33 | 10.00 | 8.20 | 4.80 |
| 90% Wet Set | % | 2.23 | 7.11 | 8.37 | 4.13 | 2.72 |
| Tan (δ) | $T_g$ (° C.) | 3 | 17 | 14 | 3 | −3 |
| E' Ratio | 15° C./30° C. | 1.80 | 2.42 | 1.93 | 1.68 | 1.45 |

TABLE 2B

TDI FOAM-PHYSICAL PROPERTIES

| Example | units | 6 | 7 | 8 | 9 | 10 |
|---|---|---|---|---|---|---|
| Actual Density | kg/m³ (lb/ft³) | 38.76 (2.42) | 38.28 (2.39) | 38.44 (2.40) | 40.69 (2.54) | 43.73 (2.73) |
| Airflow | m³/min (ft³/min) | 0.074 (2.63) | 0.065 (2.30) | 0.062 (2.18) | 0.065 (2.29) | 0.054 (1.92) |
| IFD 25% | N (lbf) | 38.92 (8.75) | 40.83 (9.18) | 45.46 (10.22) | 53.16 (11.95) | 59.07 (13.28) |
| IFD 65% | N (lbf) | 85.18 (19.15) | 95.86 (21.55) | 103.15 (23.19) | 126.12 (28.35) | 130.78 (29.40) |
| IFD 25% Return | N (lbf) | 30.42 (6.84) | 31.72 (7.13) | 35.32 (7.94) | 41.72 (9.38) | 46.17 (10.38) |
| Return Val. 25% | % | 78.18 | 77.62 | 77.69 | 78.50 | 78.14 |
| S.F. 65%/25% | NA | 2.19 | 2.35 | 2.27 | 2.37 | 2.21 |
| Tensile Strength | kPa (psi) | 48.47 (7.03) | 53.64 (7.78) | 62.54 (9.07) | 85.84 (12.45) | 114.94 (16.67) |
| Elongation | % | 174.70 | 185.05 | 182.70 | 182.60 | 190.75 |
| Tear Strength (20'/min-STDSP1) | N/m (pli) | 157.61 (0.90) | 176.87 (1.01) | 192.63 (1.10) | 241.67 (1.38) | 281.94 (1.61) |
| 90% Comp Set | % | 17.24 | 9.42 | 7.63 | 7.42 | 8.10 |
| Resilience (Ball Rebound) | % | 7.20 | 8.00 | 7.00 | 8.00 | 10.00 |
| 90% Wet Set | % | 9.17 | 9.43 | 8.40 | 7.25 | 8.70 |
| Tan (δ) | $T_g$ (° C.) | 10 | 9 | 16 | 21 | 24 |
| E' Ratio | 15° C./30° C. | 2.32 | 2.12 | 2.98 | 3.67 | 3.97 |

TABLE 2C

TDI FOAM-PHYSICAL PROPERTIES

| Example | units | 11 | 12 | 13 | 14 | 15 | 16 |
|---|---|---|---|---|---|---|---|
| Actual Density | kg/m³ (lb/ft³) | 38.76 (2.42) | 38.44 (2.40) | 40.85 (2.55) | 41.17 (2.57) | 78.65 (4.91) | 60.24 (3.76) |
| Airflow | m³/min (ft³/min) | 0.072 (2.56) | 0.10 (3.48) | 0.094 (3.34) | 0.097 (3.43) | 0.064 (2.28) | 0.064 (2.27) |
| IFD 25% | N (lbf) | 45.37 (10.20) | 48.97 (11.01) | 55.07 (12.38) | 55.60 (12.50) | 60.45 (13.59) | 49.28 (11.08) |
| IFD 65% | N (lbf) | 89.76 (20.18) | 98.44 (22.13) | 120.46 (27.08) | 121.48 (27.31) | 143.63 (32.29) | 107.73 (24.22) |
| IFD 25% Return | N (lbf) | 36.30 (8.16) | 41.37 (9.30) | 46.40 (10.43) | 46.35 (10.42) | 53.73 (12.08) | 43.63 (9.81) |
| Return Val. 25% | % | 80.00 | 84.42 | 84.24 | 83.36 | 88.89 | 88.58 |
| S.F. 65%/25% | NA | 1.98 | 2.01 | 2.19 | 2.19 | 2.38 | 2.19 |
| Tensile Strength | kPa (psi) | 64.61 (9.37) | 68.26 (9.90) | 76.19 (11.05) | 74.81 (10.85) | 32.61 (4.73) | 49.51 (7.18) |
| Elongation | % | 195.3 | 200.4 | 182.0 | 176.9 | 146.4 | 194.3 |
| Tear Strength (20'/min-STDSP1) | N/m (pli) | 185.63 (1.06) | 206.64 (1.18) | 225.90 (1.29) | 238.16 (1.36) | 117.33 (0.67) | 175.12 (1.00) |
| 90% Comp Set | % | 6.70 | 5.63 | 7.02 | 7.57 | 50.32 | 2.62 |
| Resilience (Ball Rebound) | % | 8.00 | 12.70 | 11.90 | 12.50 | 12.30 | 2.40 |
| 90% Wet Set | % | 6.40 | 2.92 | 4.05 | 4.57 | 1.77 | 1.10 |
| Tan (δ) | $T_g$ (° C.) | 14 | 10 | 14 | 15 | −3 | 16 |
| E' Ratio | 15° C./30° C. | 2.73 | 2.43 | 2.75 | 2.80 | 1.49 | 5.01 |

TABLE 3A

| Example | | 17 | 18 | 19 |
|---|---|---|---|---|
| Chemical | OH# | pphp | pphp | pphp |
| Polyol A | 100 | 83.00 | 75.00 | 74.00 |
| Polyol B | 56 | 7.00 | 7.00 | 7.00 |
| Polyol C | 25.5 | 10.00 | | |
| Polyol D | 37 | | 18.00 | 18.00 |
| Foam Modifier A | 1244 | 0.50 | 0.80 | |
| Foam Modifier B | 2417 | 0.60 | 0.60 | 0.80 |
| Surfactant A | 0 | 0.40 | 1.00 | 1.20 |
| Water (Distilled) | 6228 | 1.10 | 1.65 | 1.95 |

TABLE 3A-continued

| Example | | 17 | 18 | 19 |
|---|---|---|---|---|
| Catalyst C | 0 | 0.030 | 0.030 | 0.060 |
| Catalyst D | 276 | 0.150 | | |
| Catalyst E | 552 | 0.250 | 0.100 | 0.100 |
| Catalyst F | 189 | 0.900 | | |
| Catalyst G | 514 | | 0.320 | 0.274 |
| Isocyanate Side | F NCO* | | | |
| Isocyanate A | 48.3 | 29.05 | 34.11 | 36.50 |
| NCO Index | | 102 | 104 | 105 |

*F NCO represents the NCO group content of the isocyanate component

TABLE 3B

| Example | units | 17 | 18 | 19 |
|---|---|---|---|---|
| Actual Density | kg/m³ | 60.55 | 46.46 | 38.44 |
| | (lb/ft³) | (3.78) | (2.90) | (2.4) |
| Airflow | m³/min | 0.13 | 0.11 | 0.11 |
| | (ft³/min) | (4.6) | (4.0) | (3.9) |
| IFD 25% | N (lbf) | 36.47 | 60.94 | 67.61 |
| | | (8.2) | (13.7) | (15.2) |
| IFD 65% | N (lbf) | 90.74 | 142.34 | 149.01 |
| | | (20.4) | (32.0) | (33.5) |
| IFD 25% Return | % | 7.4 | 10.8 | 11.4 |
| Return Val. 25% | % | 89.9 | 78.8 | 74.9 |
| S.F. 65%/25% | NA | 2.5 | 2.3 | 2.2 |
| Tensile Strength | kPa (psi) | 50.33 | 99.29 | 95.84 |
| | | (7.3) | (14.4) | (13.9) |
| Elongation | % | 185 | 178 | 157 |
| Tear Strength (20'/min-STDSP1) | N/m (pli) | 175.12 | 227.66 | 210.14 |
| | | (1.0) | (1.3) | (1.2) |
| 90% Comp Set | % | 3.9 | 4.1 | 5.7 |
| Resilience (Ball Rebound) | % | 14.0 | 9.6 | 15.0 |
| 90% Wet Set | % | 2.3 | 2.2 | 4.1 |
| Tan (δ) | Tg (° C.) | 4 | 17 | 13 |
| E' Ratio | 15° C./30° C. | 1.85 | 2.88 | 2.34 |

ND* not determined

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a viscoelastic polyurethane foam comprising reacting:
   (1) toluene diisocyanate,
   with
   (2) an isocyanate-reactive component comprising:
      (a) a polyol blend having an overall hydroxyl number of from 70 mg KOH/g polyol to 110 mg KOH/g polyol, an average functionality of greater than 2, and comprising:
         (i) a monofunctional polyether having a hydroxyl number of less than or equal to 56 mg KOH/g polyol, and containing less than or equal to 20% of copolymerized oxyethylene, based on the total weight of the monofunctional polyether (2)(a)(i);
         (ii) a polyether polyol having a hydroxyl number of from 80 mg KOH/g polyol to 300 mg KOH/g polyol, a nominal functionality of 2, and containing from 5 to 45% of copolymerized oxyethylene, based on the total weight of said polyether polyol (2)(a)(ii);
         and
         (iii) a polyether polyol having a hydroxyl number of from 80 mg KOH/g polyol to 300 mg KOH/g polyol, a nominal functionality of greater than 2 to 8, and containing from 5 to 45% of copolymerized oxyethylene, based on the total weight of said polyether polyol (2)(a)(iii);
      wherein (2)(a) said polyol blend comprises 20 to 50% by weight of (2)(a)(i) said monofunctional polyether and 80 to 50% by weight of components (2)(a)(ii) and (2)(a)(iii) wherein component (2)(a)(ii) is provided in an amount of 10 to 90% by weight and component (2)(a)(iii) is provided in an amount of 90 to 10% by weight, based on the total combined weight of components (2)(a)(ii) and (2)(a)(iii);
      and, optionally,
      (b) a polyether polyol having an average functionality of from 2 to 8, a hydroxyl number of from 20 mg KOH/g polyol to 300 mg KOH/g polyol and containing at least 50% of copolymerized oxyethylene, based on the total weight of said polyether polyol (2)(b);
      wherein (2) the isocyanate-reactive component comprises (2)(a) said polyol blend in an amount of from 20% to 100% by weight and (2)(b) said polyether polyol in an amount of up to 80% by weight, with the combined weight of (2)(a) and (2)(b) totalling 100% by weight;
   in the presence of
   (3) a blowing agent;
   (4) a catalyst;
   and
   (5) a surfactant;
   wherein the quantity, OH number and functionality of components (2)(a)(i), (2)(a)(ii) and (2)(a)(iii) are selected such that the resultant viscoelastic foam has a ratio of the storage modulus ratio at 15° C. to the storage modulus at 30° C. of less than or equal to 4 to about 1, and wherein the resultant viscoelastic foam has a $T_g$ of less than 20° C. as measured by tan delta over a density range of from 1.0 lb/ft³ to 6.0 lb/ft³ at an NCO Index of greater than 95 to 110, with the proviso that when the NCO Index is greater than or equal to about 105, the isocyanate-reactive component (2) comprises at least about 3% by weight of (2)(b).

2. The process of claim 1, wherein (2)(a) said polyol blend has a hydroxyl number of from 90 mg KOH/g polyol to 110 mg KOH/g polyol and an average functionality of at least 2.1.

3. The process of claim 1, wherein (2)(a)(i) said monofunctional polyether has a hydroxyl number of less than or equal to 28 mg KOH/g polyol and contains at least 2% to 15% or less of copolymerized oxyethylene, based on the total weight of said monofunctional polyether (2)(a)(i); (2)(a)(ii) said polyether polyol has a hydroxyl number of from 85 mg KOH/g polyol to 240 mg KOH/g polyol and contains from 10% to 40% by weight of copolymerized oxyethylene, based on the total weight of said polyether polyol (2)(a)(ii); and (2)(a)(iii) said polyether polyol has a hydroxyl number of from 85 mg KOH/g polyol to 240 mg KOH/g polyol, a nominal functionality of 3 to 6, and contains 10% to 40% by weight of copolymerized oxyethylene, based on the total weight of said polyether polyol (2)(a)(iii).

4. The process of claim 1, wherein (2) said isocyanate-reactive component additionally comprises at least one of:
   (2)(c) a polyether polyol having an hydroxyl number of from 10 mg KOH/g polyol to 300 mg KOH/g polyol, an average functionality of from 2 to 8, and which contains from 0 to 45% by weight of copolymerized oxyethylene, based on 100% by weight of component (2)(c), wherein polyether polyol (2)(c) is different than polyether polyols (2)(a)(ii) and (2)(a)(iii);

and/or (2)(d) a filled polyol.

5. The process of claim 1, wherein said polyol blend (2)(a) comprises 25 to 45% by weight of (2)(a)(i) said monofunctional polyether, and 80 to 50% by weight of components (2)(a)(ii) and (2)(a)(iii) wherein from 15 to 85% by weight comprises component (2)(a)(ii) and from 85% to 15% by weight comprises component (2)(a)(iii).

6. The process of claim 1, wherein the relative amounts of (2)(a) and (2)(b) are 85% to 99% by weight of (2)(a) and 15% to 1% by weight of (2)(b), wherein the %'s by weight of (2)(a) and (2)(b) are based on 100% by weight of the combined weight of components (2)(a) and (2)(b).

7. The process of claim 1, wherein (2)(b) said polyether polyol has a hydroxyl number of 30 mg KOH/g polyol to 170 mg KOH/g polyol, an average functionality of 2.5 to 6, and contains 50% to 99% by weight of copolymerized oxyethylene, based on 100% by weight of component (2)(b).

8. The process of claim 1, wherein (2)(a) said polyol blend is formed in-situ and prepared by:
A) introducing into a reaction vessel a mixture comprising:
(1) an initial starter ($S_i$) comprising a monofunctional compound having a hydroxyl number of less than 56 mg KOH/g polyol,
and
(2) a DMC (double metal cyanide) catalyst,
B) feeding
(1) an epoxide comprising propylene oxide and ethylene oxide in a weight ratio of from 100:0 to 20:80, into the reaction vessel;
C) allowing said epoxide mixture and said initial starter ($S_i$) to react and continuing to polymerize by feeding the epoxide until the equivalent weight of said monofunctional compound is increased by at least 10% by weight and reaches a value between about 1,500 and about 6,000;
D) continuously adding
(1) a low molecular weight starter ($S_c$) having a nominal functionality of greater than 2 to 6, and an equivalent weight of 28 to 400 into the reaction vessel while continuing to feed epoxide;
E) completing addition of the continuous starter ($S_c$);
and
F) allowing the mixture to continue polymerizing in the reaction vessel thereby forming
(2)(a) an in-situ formed polyol blend which has an overall hydroxyl number of from 70 mg KOH/g polyol to 110 mg KOH/g polyol, an average functionality of greater than 2, and which comprises
(i) a monofunctional polyether having a hydroxyl number of less than or equal to 56 mg KOH/g polyol, and containing less than or equal to 20% by weight of copolymerized oxyethylene, based on 100% by weight of said monofunctional polyether (2)(a)(i);
(ii) a polyether polyol having a hydroxyl number of 80 mg KOH/g polyol to 300 mg KOH/g polyol, a nominal functionality of 2 and containing from 5 to 45% by weight of copolymerized oxyethylene, based on the total weight of said polyether polyol (2)(a)(ii);
and
(iii) a polyether polyol having a hydroxyl number of 80 mg KOH/g polyol to 300 mg KOH/g polyol, a nominal functionality of greater than 2 to 8, and containing from 5 to 45% by weight of copolymerized oxyethylene, based on the total weight of said polyether polyol (2)(a)(iii);
wherein (2)(a) said polyol blend comprises 20 to 50% by weight of (2)(a)(i) said monofunctional polyether and 80 to 50% by weight of components (2)(a)(ii) and (2)(a)(iii) wherein from 10 to 90% by weight comprises component (2)(a)(ii) and from 90 to 10% by weight comprises component (2)(a)(iii);
and, optionally,
(II) combining said in-situ formed polyol blend (2)(a) with
(2)(b) up to 80% by weight, based on 100% by weight of components (2)(a) and (2)(b), of a polyether polyol having an average functionality of 2 to 8, a hydroxyl number of 20 mg KOH/g polyol to 300 mg KOH/g polyol and containing at least 50% of copolymerized oxyethylene, based on the total by weight of said polyether polyol (2)(b).

9. The process of claim 8 wherein the resultant in-situ formed polyol blend is additionally combined with at least one of: (c) one or more polyether polyols having an hydroxyl number of from about 10 mg KOH/g polyol to about 300 mg KOH/g polyol, an average functionality of from about 2 to about 8, and which contain from 0 to 45% by weight of copolymerized oxyethylene, based on 100% by weight of component (c); and (d) one or more filled polyols.

10. The process of claim 8, wherein A)(1) said initial starter ($S_i$) is prepared from a starter comprising one or more $C_{12}$, $C_{13}$, $C_{14}$ and/or $C_{15}$ long chain alcohols.

11. The process of claim 8, wherein said low molecular weight starter ($S_c$) comprises glycerin, propylene glycol, ethylene glycol, sucrose, sorbitol, or mixtures thereof.

12. The process of claim 8, wherein the resultant polyol composition in F) has an overall hydroxyl number of 90 mg KOH/g polyol to 110 mg KOH/g polyol and an average functionality of at least 2.1.

13. The process of claim 1, wherein said viscoelastic polyurethane foam has a $T_g$ of less than 18° C. as measured by tan delta, and has a ratio of the storage modulus at 15° C. to the storage modulus at 30° C. of less than or equal to 3 to 1.1.

14. The process of claim 1, wherein said viscoelastic polyurethane foam has a $T_g$ of less than 17° C. as measured by tan delta, and has a ratio of the storage modulus at 15° C. to the storage modulus at 30° C. of less than or equal to 3 to 1.2.

15. The process of claim 1, wherein (4) said catalyst comprises a non-fugitive amine catalyst.

16. The process of claim 1, wherein (3) said blowing agent comprises water.

17. A viscoelastic polyurethane foam comprising the reaction product of:
(1) toluene diisocyanate,
with
(2) an isocyanate-reactive component comprising:
(a) a polyol blend having an overall hydroxyl number of from 70 mg KOH/g polyol to 110 mg KOH/g polyol, an average functionality of greater than 2, and comprising:
(i) a monofunctional polyether having a hydroxyl number of less than or equal to 56 mg KOH/g polyol, and containing less than or equal to 20% of copolymerized oxyethylene, based on the total weight of said monofunctional polyether (2)(a)(i);

(ii) a polyether polyol having a hydroxyl number of from 80 mg KOH/g polyol to 300 mg KOH/g polyol, a nominal functionality of 2, and containing from 5 to 45% of copolymerized oxyethylene, based on the total weight of said polyether polyol (2)(a)(ii);

and (iii) a polyether polyol having a hydroxyl number of from 80 mg KOH/g polyol to 300 mg KOH/g polyol, a nominal functionality of greater than 2 to 8, and containing from 5 to 45% of copolymerized oxyethylene, based on the total weight of said polyether polyol (2)(a)(iii);

wherein (2)(a) said polyol blend comprises 20 to 50% by weight of (2)(a)(i) said monofunctional polyether and 80 to 50% by weight of components (2)(a)(ii) and (2)(a)(iii) wherein component (2)(a)(ii) is provided in an amount of 10 to 90% by weight and component (2)(a)(iii) is provided in an amount of 90 to 10% by weight, based on the total combined weight of components (2)(a)(ii) and (2)(a)(iii);

and, optionally, (b) a polyether polyol having an average functionality of from 2 to 8, a hydroxyl number of from 20 mg KOH/g polyol to 300 mg KOH/g polyol and containing at least 50% of copolymerized oxyethylene, based on the total weight of said polyether polyol (2)(b);

wherein (2) the isocyanate-reactive component comprises (2)(a) said polyol blend in an amount of from 20% to 100% by weight and (2)(b) said polyether polyol in an amount of up to 80% by weight, with the combined weight of (2)(a) and (2)(b) totaling 100% by weight;

in the presence of (3) a blowing agent;

(4) a catalyst;

and (5) a surfactant;

wherein the quantity, OH number and functionality of components (2)(a)(i), (2)(a)(ii) and (2)(a)(iii) are selected such that the resultant viscoelastic foam has a ratio of the storage modulus at 15° C. to the storage modulus at 30° C. of less than or equal to 4 to 1, and wherein the resultant viscoelastic foam has a $T_g$ of less than 20° C. as measured by tan delta over a density range of from 1.0 lb/ft$^3$ to 6.0 lb/ft$^3$ at an NCO Index of greater than 95 to 110, with the proviso that when the NCO Index is greater than or equal to about 105, the isocyanate-reactive component (2) comprises at least about 3% by weight of (2)(b).

18. The viscoelastic polyurethane foam of claim 17, wherein (2)(a) said polyol blend has a hydroxyl number of from 90 mg KOH/g polyol to 110 mg KOH/g polyol and an average functionality of at least 2.1.

19. The viscoelastic polyurethane foam of claim 17, wherein (2)(a)(i) said monofunctional polyether has a hydroxyl number of less than or equal to 28 mg KOH/g polyol and contains at least 2% to 15% or less of copolymerized oxyethylene, based on the total weight of said monofunctional polyether (2)(a)(i); (2)(a)(ii) said polyether polyol has a hydroxyl number of from 85 mg KOH/g polyol to 240 mg KOH/g polyol and contains from 10% to 40% by weight of copolymerized oxyethylene, based on the total weight of said polyether polyol (2)(a)(ii); and (2)(a)(iii) said polyether polyol has a hydroxyl number of from 85 mg KOH/g polyol to 240 mg KOH/g polyol, a nominal functionality of 3 to 6, and contains 10% to 40% by weight of copolymerized oxyethylene, based on the total weight of said polyether polyol (2)(a)(iii).

20. The viscoelastic polyurethane foam of claim 17, wherein (2) said isocyanate-reactive component additionally comprises at least one of:

(2)(c) a polyether polyol having an hydroxyl number of from 10 mg KOH/g polyol to 300 mg KOH/g polyol, an average functionality of from 2 to 8, and which contains from 0 to 45% by weight of copolymerized oxyethylene, based on 100% by weight of component (2)(c), wherein polyether polyol (2)(c) is different than polyether polyols (2)(a)(ii) and (2)(a)(iii);

and/or (2)(d) a filled polyol.

21. The viscoelastic polyurethane foam of claim 17, wherein the resultant foam has a $T_g$ of less than 18° C. as measured by tan delta and has a ratio of the storage modulus at 15° C. to the storage modulus at 30° C. of less than or equal to 3 to 1.1.

* * * * *